United States Patent
Jiang et al.

(10) Patent No.: US 12,200,690 B2
(45) Date of Patent: Jan. 14, 2025

(54) METHODS AND APPARATUSES FOR TRANSMITTING AND RECEIVING UPLINK SIGNAL

(71) Applicant: FUJITSU LIMITED, Kawasaki (JP)

(72) Inventors: Qinyan Jiang, Beijing (CN); Lei Zhang, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 358 days.

(21) Appl. No.: 17/573,690

(22) Filed: Jan. 12, 2022

(65) Prior Publication Data

US 2022/0132540 A1 Apr. 28, 2022

Related U.S. Application Data

(63) Continuation of application No. PCT/CN2019/101205, filed on Aug. 16, 2019.

(51) Int. Cl.
*H04W 72/12* (2023.01)
*H04L 5/00* (2006.01)
(Continued)

(52) U.S. Cl.
CPC ....... *H04W 72/1268* (2013.01); *H04L 5/0051* (2013.01); *H04W 72/0446* (2013.01); *H04W 72/0453* (2013.01)

(58) Field of Classification Search
CPC ... H04L 5/0053; H04L 5/0092; H04L 5/0005; H04L 5/0051; H04L 1/1893;
(Continued)

(56) References Cited

U.S. PATENT DOCUMENTS

2019/0230689 A1* 7/2019 Cao ................... H04L 27/2602
2020/0100275 A1 3/2020 Tang et al.
(Continued)

FOREIGN PATENT DOCUMENTS

CN 106851822 A 6/2017
CN 108289333 A 7/2018
(Continued)

OTHER PUBLICATIONS

Extended European search report with the supplementary European search report and the European search opinion Issued by the European Patent Office for corresponding European Patent Application No. 19942597.6-1213, mailed on Jul. 25, 2022.
(Continued)

*Primary Examiner* — Brian D Nguyen
(74) *Attorney, Agent, or Firm* — Myers Wolin, LLC

(57) ABSTRACT

Methods and apparatuses for transmitting and receiving an uplink signal. The method includes: receiving first indication information by a terminal equipment, the first indication information being used to indicate at least one semi-statically configured or semi-persistently scheduled time-frequency resource; receiving physical layer signaling, the physical layer signaling being used to indicate a first starting position within a time domain range of one or more time-frequency resource(s) in the at least one time-frequency resource; and transmitting an uplink signal starting from the first starting position on the one or more time-frequency resource(s).

12 Claims, 7 Drawing Sheets

(51) Int. Cl.
*H04W 72/04* (2023.01)
*H04W 72/0446* (2023.01)
*H04W 72/0453* (2023.01)
*H04W 72/1268* (2023.01)

(58) Field of Classification Search
CPC .... H04L 1/1671; H04L 1/1822; H04W 72/21; H04W 72/0446; H04W 72/0453; H04W 72/1268
See application file for complete search history.

(56) References Cited

U.S. PATENT DOCUMENTS

| | | | |
|---|---|---|---|
| 2020/0187228 A1 | 6/2020 | Cheng et al. | |
| 2020/0287676 A1 | 9/2020 | Jo et al. | |
| 2020/0305138 A1* | 9/2020 | Li | H04W 72/23 |
| 2020/0329392 A1* | 10/2020 | Onggosanusi | H04L 5/0048 |
| 2021/0051687 A1* | 2/2021 | Yang | H04W 56/0045 |
| 2022/0345257 A1* | 10/2022 | Moon | H04W 72/23 |
| 2024/0090035 A1* | 3/2024 | Moon | H04L 5/0092 |

FOREIGN PATENT DOCUMENTS

| | | |
|---|---|---|
| CN | 109845374 A | 6/2019 |
| CN | 110100485 A | 8/2019 |
| WO | 2018/173004 A1 | 9/2018 |
| WO | 2018/175596 A1 | 9/2018 |
| WO | 2019/083341 A1 | 5/2019 |

OTHER PUBLICATIONS

Notice of Reasons for Refusal issued by the Japan Patent Office for corresponding Japanese Patent Application No. 2022-507755, mailed on Feb. 21, 2023, with an English translation.

Huawei et al., "Summary of remaining issues on UL data transmission procedure", Agenda Item: 7.1.3.3.4, 3GPP TSG-RAN WG1 Meeting #92, R1-1801786, Athens, Greece, Feb. 26-Mar. 2, 2018.

Notice of Preliminary Rejection issued by the Korean Intellectual Property Office for corresponding Korean Patent Application No. 10-2022-7004242, mailed on Nov. 19, 2023, with an English translation.

First Notification of Office Action and Search Report issued by the China National Intellectual Property Administration for corresponding Chinese Patent Application No. 201980098306.6, mailed on Nov. 1, 2023, with an English translation.

International Search Report and Written Opinion of the International Searching Authority issued by the China National Intellectual Property Administration for corresponding International Patent Application No. PCT/CN2019/101205, mailed on Apr. 29, 2020, with an English translation.

VIVO, "PUSCH enhancements for URLLC", Agenda Item: 7.2.6.3, 3GPP TSG-RAN WG1 Meeting #97, R1-1906148, Reno, USA, May 13-17, 2019.

Examination Report issued by the Indian Patent Office for corresponding Indian Patent Application No. 202237001356, dated Jul. 6, 2022, with an English translation.

* cited by examiner

METHODS AND APPARATUSES FOR TRANSMITTING AND RECEIVING UPLINK SIGNAL

CROSS-REFERENCE TO RELATED APPLICATION

This application is a continuation application of International Application PCT/CN2019/101205 filed on Aug. 16, 2019 and designated the U.S., the entire contents of which are incorporated herein by reference.

TECHNICAL FIELD

This disclosure relates to the field of communication technologies.

BACKGROUND

Unlicensed frequency bands are important components of spectrum resources, and there are already many systems supporting data transmission on unlicensed frequency bands, such as WiFi, long term evolution (LTE) license assisted access (LAA). However, a New Radio (NR) system does not support unlicensed frequency bands at present.

On an unlicensed frequency band, in order to make use of spectrum resources fairly and efficiently between different systems/devices, before transmitting data, a device needs to acknowledge that resources are available. Since it is needed to acknowledge that resources are available before transmitting, before transmitting dynamic scheduling indication information, uplink transmission based on dynamic scheduling requires a network device (such as base station) to acknowledge that a resource is available; a terminal equipment (such as UE) transmits uplink transmission on a corresponding resource after acknowledge that the resource indicated by the dynamic scheduling indication information is available. This may result in degradation of efficiency of the uplink transmission based on dynamic scheduling and possible increase of latency; and in this sense, application of uplink transmission that is not based on dynamic scheduling in unlicensed frequency bands may achieve higher efficiency and lower latency.

On the other hand, configuration grant (CG) is introduced into NR. NR supports two types of CGs: a first type of configuration grant (CG type 1) and a second type of configuration grant (CG type 2).

In CG type 1, time-frequency resources and other parameters needed in transmitting PUSCHs on configured time-frequency resources are configured via RRC signaling, and after receiving the RRC signaling, a terminal equipment may transmit the PUSCHs on the configured time-frequency resources.

In CG type 2, resource configuration includes two steps: after configuring such parameters as a period of a time domain resource, etc., via higher layer signaling, and configuring the time domain resource, a frequency-domain resource and other parameters needed in transmitting PUSCHs on the configured time-frequency resources via an active DCI, and after receiving the active DCI, the terminal equipment may transmit the PUSCHs on the configured time-frequency resources.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

However, it was found by the inventors that if a CG is applied to an NR system deployed on an unlicensed band (NR_U, NR operation on unlicensed band), resource usage requirements of the NR_U need to be met, for example, the terminal equipment needs at least to acknowledge that time-frequency resources are available before transmitting PUSCHs. Therefore, the CG-based PUSCH transmission scheme in NR cannot be directly applied to the NR_U.

In response to at least one of the above problems, embodiments of this disclosure provide methods and apparatuses for transmitting and receiving an uplink signal, which may support transmission and reception of a CG-based uplink signal (such as a PUSCH) satisfying NR-U requirements, or transmission and reception of other uplink signals (such as a PRACH, PUCCH, SRS) on semi-statically configured or semi-persistently scheduled time-frequency resources.

According to an aspect of the embodiments of this disclosure, there is provided a method for transmitting an uplink signal, including:
   generating an uplink signal by a terminal equipment; and
   in a case where the terminal equipment does not receive corresponding dynamic indication information used for indicating uplink and downlink configurations, transmitting the uplink signal on one or more semi-statically configured or semi-persistently scheduled time-frequency resources comprising at least one symbol predefined or semi-statically configured as being flexible.

According to another aspect of the embodiments of this disclosure, there is provided an apparatus for transmitting an uplink signal, including:
   a signal generating unit configured to generate an uplink signal; and
   a signal transmitting unit configured to, in a case where a terminal equipment does not receive corresponding dynamic indication information used for indicating uplink and downlink configurations, transmit the uplink signal on one or more semi-statically configured or semi-persistently scheduled time-frequency resources comprising at least one symbol predefined or semi-statically configured as being flexible.

According to another aspect of the embodiments of this disclosure, there is provided a method for receiving an uplink signal, including:
   receiving an uplink signal by a network device,
   wherein, the uplink signal is transmitted by a terminal equipment on one or more symbols predefined or semi-statically configured as being flexible when the terminal equipment does not receive corresponding dynamic indication information used for indicating uplink and downlink configurations.

According to another aspect of the embodiments of this disclosure, there is provided an apparatus for receiving an uplink signal, including:
   a signal receiving unit configured to receive an uplink signal,
   wherein, the uplink signal is transmitted by a terminal equipment on one or more symbols predefined or semi-statically configured as being flexible when the terminal equipment does not receive corresponding dynamic indication information used for indicating uplink and downlink configurations.

According to another aspect of the embodiments of this disclosure, there is provided a method for transmitting an uplink signal, including:

receiving first indication information by a terminal equipment, the first indication information being used to indicate at least one semi-statically configured or semi-persistently scheduled time-frequency resource;

receiving physical layer signaling by the terminal equipment, the physical layer signaling being used to indicate a first starting position within a time domain range of one or more time-frequency resource(s) in the at least one time-frequency resource; and transmitting an uplink signal by the terminal equipment starting from the first starting position on the one or more time-frequency resource(s).

According to another aspect of the embodiments of this disclosure, there is provided an apparatus for transmitting an uplink signal, including:

an information receiving unit configured to receive first indication information, the first indication information being used to indicate at least one semi-statically configured or semi-persistently scheduled time-frequency resource;

a signaling receiving unit configured to receive physical layer signaling, the physical layer signaling being used to indicate a first starting position within a time domain range of one or more time-frequency resource(s) in the at least one time-frequency resource; and a signal transmitting unit configured to transmit an uplink signal starting from the first starting position on the one or more time-frequency resource(s).

According to a further aspect of the embodiments of this disclosure, there is provided a method for receiving an uplink signal, including:

transmitting first indication information by a network device, the first indication information being used to indicate at least one semi-statically configured or semi-persistently scheduled time-frequency resource;

transmitting physical layer signaling by the network device, the physical layer signaling being used to indicate a first starting position within a time domain range of one or more time-frequency resource(s) in the at least one time-frequency resource; and receiving an uplink signal by the network device, the uplink signal being transmitted starting from the first starting position on the one or more time-frequency resource(s).

According to still another aspect of the embodiments of this disclosure, there is provided an apparatus for receiving an uplink signal, including:

an information transmitting unit configured to transmit first indication information, the first indication information being used to indicate at least one semi-statically configured or semi-persistently scheduled time-frequency resource;

a signaling transmitting unit configured to transmit physical layer signaling, the physical layer signaling being used to indicate a first starting position within a time domain range of one or more time-frequency resource(s) in the at least one time-frequency resource; and a signal receiving unit configured to receive an uplink signal, the uplink signal being transmitted starting from the first starting position on the one or more time-frequency resource(s).

According to yet another aspect of the embodiments of this disclosure, there is provided a communication system, including:

a terminal equipment configured to receive first indication information, the first indication information being used to indicate at least one semi-statically configured or semi-persistently scheduled time-frequency resource; receive physical layer signaling, the physical layer signaling being used to indicate a first starting position within a time domain range of one or more time-frequency resource(s) in the at least one time-frequency resource; and transmit an uplink signal starting from the first starting position on the one or more time-frequency resource(s); and a network device configured to transmit the first indication information and the physical layer signaling, and receive the uplink signal.

An advantage of the embodiments of this disclosure exists in that by indicating a first starting position in a time domain range of one or more semi-statically configured or semi-persistently scheduled time-frequency resource(s) via physical layer signaling and transmitting an uplink signal by using the first starting position, transmission and reception of a CG-based uplink signal satisfying NR-U requirements, or transmission and reception of other uplink signals on semi-statically configured or semi-persistently scheduled time-frequency resources, may be supported.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION OF THE DISCLOSURE

Figure 1:
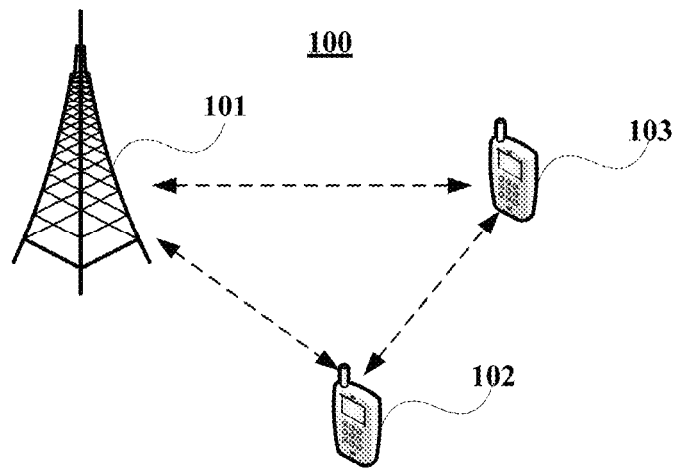
FIG. 1 is schematic diagram of a communication system of embodiments of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiments of this disclosure, existing service transmission or service transmission that may be implemented in the future may be performed between the network device 101 and the terminal equipments 102, 103. For example, such services may include but not limited to an enhanced mobile broadband (eMBB), massive machine type communication (mMTC), and ultra-reliable and low-latency communication (URLLC), etc.

In order to support data transmission on unlicensed frequency bands, LAA has been introduced into LTE (hereinafter referred to as LTE-LAA). LTE-LAA supports uplink transmission based on semi-persistent scheduling, such as an AUL PUSCH. In order to reduce workload of standardization, solutions in LTE-LAA may be used as much as possible to support uplink transmission based on semi-static configuration or semi-persistent scheduling in NR_U. However, from LTE to NR, flexibility of NR increases, and more application scenarios may be covered. Accordingly, it is desired in the industry that NR_U is more flexible than LTE-LAA.

For example, LTE-LAA only supports two channel access modes, while NR_U may support more than two channel access modes. For example, in LTE-LAA, a channel occupation time (COT) includes only one time of uplink and downlink conversion, while in NR-U, a channel occupation time may include two or more times of uplink and downlink conversion.

For another example, LTE-LAA only supports a subcarrier spacing (SCS) of 15 kHz, while NR_U may support more than one SCSs, such as 15 kHz, 30 kHz, 60 kHz, and 120 kHz, etc. For a further example, subframe is used as a unit in LTE-LAA for scheduling, while a slot and/or a symbol is/are used as a unit/units in NR_U for scheduling.

For still another example, LTE-LAA only supports transmitting a PUSCH and sounding reference signal (SRS) on an unlicensed frequency band, and NR_U may further support transmitting a physical random access channel (PRACH) and a physical uplink control channel (PUCCH) on an unlicensed frequency band, and the PRACH and PUCCH may also be transmitted on semi-statically configured or semi-persistent scheduled time-frequency resources.

Taking the above differences between NR_U and LTE-LAA into account, the scheme in LTE-LAA cannot be directly applied to NR_U. The embodiment of this disclosure provides an uplink transmission scheme suitable for NR_U.

In the following description, without causing confusion, the terms "uplink control signal" and "uplink control information (UCI)" or "physical uplink control channel (PUCCH)" may be interchangeable, and the terms "uplink data signal" and "uplink data information" or "physical uplink shared channel (PUSCH)" may be interchangeable;
the terms "downlink control signal" and "downlink control information (DCI)" or "physical downlink control channel (PDCCH)" are interchangeable, and the terms "downlink data signal" and "downlink data information" or "physical downlink shared channel (PDSCH)" may be interchangeable.

In addition, transmitting or receiving a PUSCH may be understood as transmitting or receiving uplink data carried by a PUSCH, and transmitting or receiving a PUCCH may be understood as transmitting or receiving uplink information carried by a PUCCH; and uplink signals may include uplink data signals and/or uplink control signals, etc., and may also be referred to as uplink transmissions (UL transmissions) or uplink information or uplink channels.

Embodiments of a First Aspect

Figure 2:
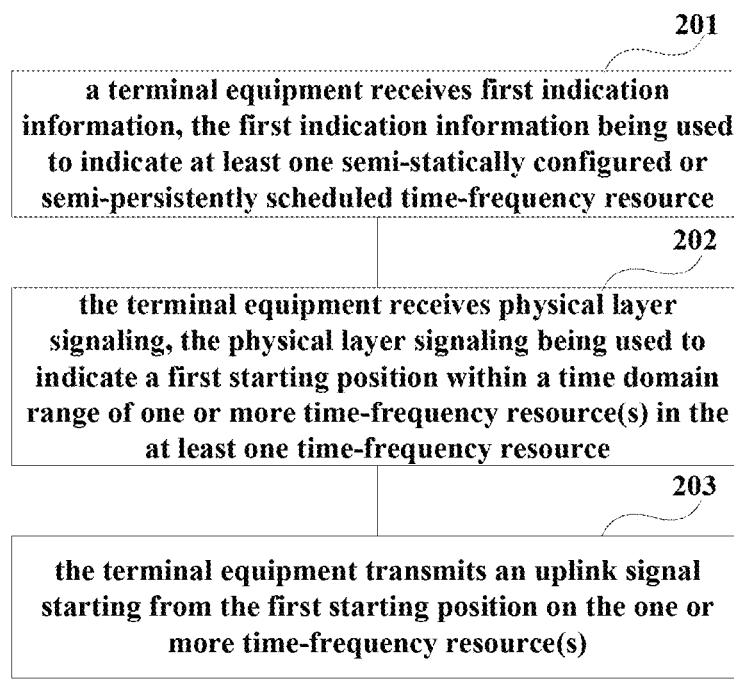
FIG. 2 is a schematic diagram of a method for transmitting an uplink signal of embodiments of this disclosure.

The embodiments of this disclosure provide a method for transmitting an uplink signal, which shall be described from a terminal equipment side. FIG. 2 is a schematic diagram of a method for transmitting an uplink signal of the embodiments of this disclosure. As shown in FIG. 2, the method includes:

201: a terminal equipment receives first indication information, the first indication information being used to indicate at least one semi-statically configured or semi-persistently scheduled time-frequency resource;

202: the terminal equipment receives physical layer signaling, the physical layer signaling being used to indicate a first starting position within a time domain range of one or more time-frequency resource(s) in the at least one time-frequency resource; and 203: the terminal equipment transmits an uplink signal starting from the first starting position on the one or more time-frequency resource(s).

It should be noted that FIG. 2 only schematically illustrates the embodiment of this disclosure;
however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 2.

In some embodiments, the first indication information is, for example, carried by higher layer signaling and/or physical layer signaling, the higher layer signaling being, for example, radio resource control (RRC) signaling (such as being referred to as an RRC message), including for example, an MIB, system information, and a dedicated RRC message; or being referred to as an RRC IE (RRC information element) and/or MAC (media access control) signaling (or referred to as an MAC IE (MAC information element)); however, this disclosure is not limited thereto. The first indication information is used to indicate at least one semi-statically configured or semi-persistently scheduled time-frequency resource, the at least one time-frequency resource being used by the terminal equipment to transmit an uplink signal.

Figure 3:
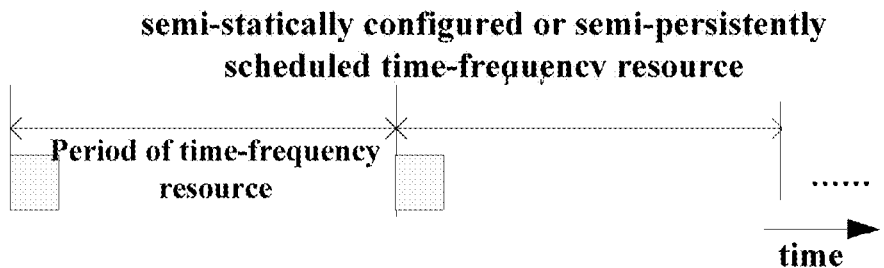
FIG. 3 is an exemplary diagram of a semi-statically configured or semi-persistently scheduled time-frequency resource of the embodiments of this disclosure.

FIG. 3 is an exemplary diagram of the semi-statically configured or semi-persistently scheduled time-frequency resource of the embodiments of this disclosure. As shown in FIG. 3, a time-frequency resource may be semi-statically configured or semi-persistently scheduled in one period.

Figure 4:
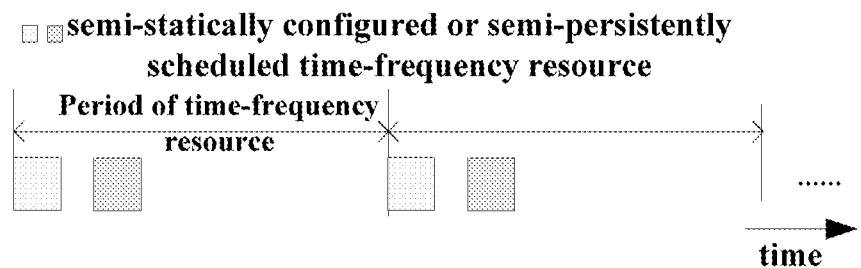
FIG. 4 is another exemplary diagram of the semi-statically configured or semi-persistently scheduled time-frequency resource of the embodiments of this disclosure.
Figure 5:
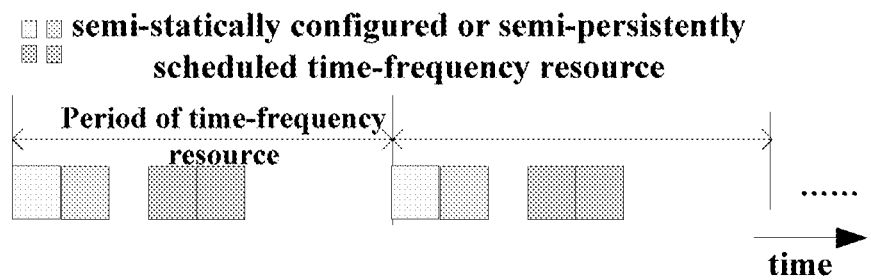
FIG. 5 is a further exemplary diagram of the semi-statically configured or semi-persistently scheduled time-frequency resource of the embodiments of this disclosure.

FIG. 4 is another exemplary diagram of the semi-statically configured or semi-persistently scheduled time-frequency resource of the embodiments of this disclosure, and FIG. 5 is a further exemplary diagram of the semi-statically configured or semi-persistently scheduled time-frequency resource of the embodiments of this disclosure. As shown in FIGS. 4 and 5, assuming that two or more time-frequency resources are semi-statically configured or semi-persistently scheduled in one period, at least two time-frequency resources neighboring in the time domain are discontinuous.

Figure 6:
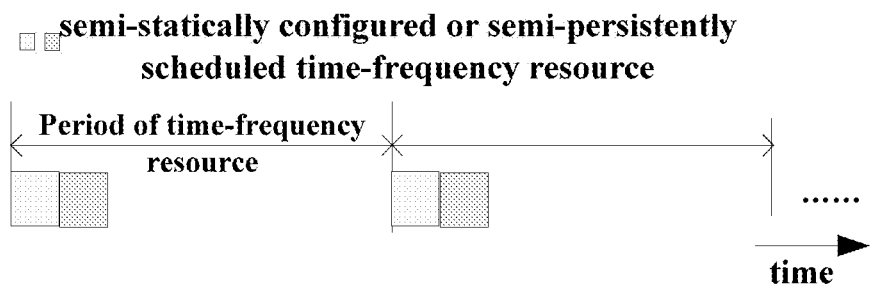
FIG. 6 is still another exemplary diagram of the semi-statically configured or semi-persistently scheduled time-frequency resource of the embodiments of this disclosure.

FIG. 6 is still another exemplary diagram of the semi-statically configured or semi-persistently scheduled time-frequency resource of the embodiments of this disclosure. As shown in the figure, assuming that two or more time-frequency resources are semi-statically configured or semi-persistently scheduled in one period, time-frequency resources neighboring in the time domain are continuous.

Schematic description is given in FIGS. 3 to 6 by taking the periodically semi-statically configured or semi-persistently scheduled time-frequency resources as example; however, this disclosure is not limited thereto.

The terminal equipment may transmit an uplink signal on one or more of these semi-statically configured or semi-persistently scheduled time-frequency resource(s) (referred to herein as at least one time-frequency resource), the one or more time-frequency resource(s) is/are, for example, selected by the terminal equipment; however, this disclosure is not limited thereto. For the sake of simplicity, the one or more time-frequency resource(s) is/are hereinafter referred to as first time-frequency resources, and uplink signal transmission of this time (or uplink transmission of this time) is referred to as first uplink transmission.

In some embodiments, the uplink signal may include a signal or channel of at least one of the following: a physical uplink shared channel (PUSCH), a physical random access channel (PRACH), a physical uplink control channel (PUCCH), a reference signal (such as a sounding reference signal (SRS), a demodulation reference signal (DMRS)); however, this disclosure is not limited thereto. Following description shall be given by taking a PUSCH as an example.

Figure 7:
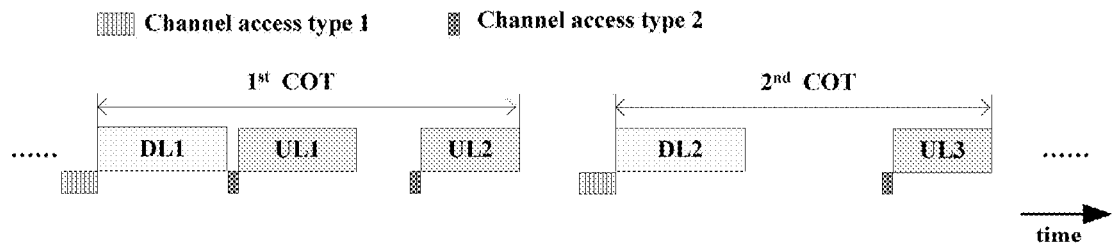
FIG. 7 is a schematic diagram of a COT of LTE-LAA.

In LTE-LAA, only one uplink/downlink conversion is included in a channel occupation time (COT), and a time interval between adjacent transmissions in a COT is not strictly limited. FIG. 7 is a schematic diagram of a COT of LTE-LAA. As shown in FIG. 7, only one time of uplink and downlink conversion is included in a channel occupation time.

Figure 8:
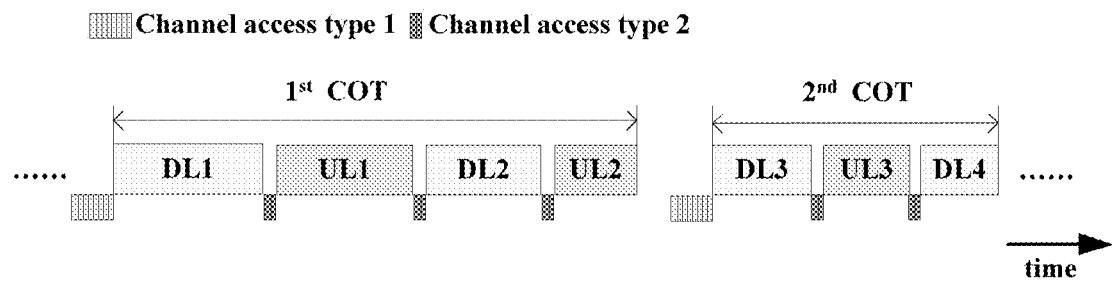
FIG. 8 is an exemplary diagram of a COT of the embodiments of this disclosure.

However, in NR_U, one channel occupation time may include two or more times of uplink and downlink conversion. Taking fair coexistence with other techniques (such as LAA, and WiFi), there may be more strict restrictions for time intervals between adjacent transmissions in one COT. FIG. 8 is an exemplary diagram of a COT of the embodiments of this disclosure. As shown in FIG. 8, one channel occupation time may include two or more times of uplink and downlink conversion.

For example, if the terminal equipment transmits an uplink transmission by using following class 1 channel access mode, a time interval between the uplink transmission and a previous transmission may need to meet a certain time interval requirement. For example, the time interval between the uplink transmission and the previous transmission is not greater than 25 us.

Furthermore, the class 1 channel access mode supported in LTE-LAA only includes mode B, while NR_U may support more than one class 1 channel access modes, and the time interval requirements to which different class 1 channel access modes correspond may be different.

For example, as shown in Table 1 below, if the terminal equipment transmits an uplink transmission by using mode B, a time interval between the uplink transmission and a previous transmission should be equal to 25 us, if the terminal equipment transmits an uplink transmission by using mode C, a time interval between the uplink transmission and a previous transmission should be equal to 16 us, and if the terminal equipment transmits an uplink transmission by using mode D, a time interval between the uplink transmission and a previous transmission should be less than or equal to 16 us.

TABLE 1

| | |
|---|---|
| Mode B | =25 us |
| Mode C | =16 us |
| Mode D | =<16 us |

As the previous transmission may be transmitted by a base station or other devices, in order to ensure that the time interval between the uplink transmission and the previous transmission meets requirements, the base station needs to dynamically indicate a starting position for transmitting the uplink transmission.

In the embodiments of this disclosure, a network device may dynamically indicate a first starting position within a time domain range of a first time-frequency resource via physical layer signaling, so as to ensure that a time interval between the first uplink transmission and another transmission (such as the previous transmission) meet the requirements, thereby supporting the CG uplink transmission satisfying NR-U requirements.

In some embodiments, the physical layer signaling refers to control information carried by a physical layer control channel and/or a physical layer signal, such as information carried by DCI and/or a sequence in PDCCH; however, this disclosure is not limited thereto. And one piece of physical layer signaling may be used to indicate one or more first starting positions.

For example, one piece of physical layer signaling is only used to indicate a first starting position to which the first time-frequency resource corresponds.

For another example, the physical layer signaling is used to indicate a first starting position to which the first time-frequency resource corresponds, and is further used to indicate a first starting position to which the second time-frequency resource corresponds. The first time-frequency resource is one or more continuous or discontinuous time-frequency resources in the time domain, and the second time-frequency resource is another one or more continuous or discontinuous time-frequency resources. The first starting position to which the first time-frequency resource corresponds is within the time domain range of the first time-frequency resource, and the first starting position to which the second time-frequency resource corresponds is within a time domain range of the second time-frequency resource. A method for transmitting an uplink signal on the second time-frequency resource is identical to a behavior of transmitting the uplink signal on the first time-frequency resource by the terminal equipment.

In some embodiments, channel access modes may be divided into two classes: a first class of channel access mode (class 1) and a second class of channel access modes (class 2).

The first class of channel access mode (class 1) is a channel access mode used for channel sharing; for example, it may include:
mode B (channel access type B): channel access with a channel detection time of 25 us;
mode C (channel access type C): channel access with a channel detection time of 16 us (not supported in LTE-LAA);
mode D (channel access type D): direct transmission (not supported in LTE-LAA).

The second class of channel access mode (class 2) is a channel access mode used to initialize an occupied channel, or may be referred to as an independent channel access mode; for example, it may include:

mode A (channel access type A): channel access performing random backoff based on a variable contention window.

Class 1 may also include other channel access modes. For example, multiple channel access modes in class 1 may have different channel detection time, and class 2 may also include other channel access modes; for example, multiple channel access modes in class 2 may have different priorities, the different priorities having different contention window value ranges. The channel access modes are only schematically described above; however, this disclosure is not limited thereto. For example, the channel detection time and/or priorities may also be changed so as to define more modes.

In some embodiments, the terminal equipment may support one or more channel access mode(s) in class 1, and/or, may also support one or more channel access mode(s) in class 2. For a certain uplink transmission, one of at least one channel access mode supported by the terminal equipment needs to be adopted.

For example, the terminal equipment may support at least one first channel access mode, such as supporting modes B and C; it may also support at least one first channel access mode and at least one second channel access mode, such as supporting modes A and B; and it may also support at least one second channel access mode, such as mode A.

For example, the terminal equipment supports mode A and mode B, and the first uplink transmission may be transmitted by using mode B (the first channel access mode), in other words, the terminal equipment may transmit the first uplink transmission by using mode B (the first channel access mode).

In this disclosure, at least one channel access mode that the terminal equipment supports (or is able to use) includes a channel access mode that may be used by the terminal equipment to transmit the first uplink transmission on the first time-frequency resource. At least one channel access mode supported by the terminal equipment may be per UE (that is, for different uplink transmission types and/or different time-frequency resource configurations, at least one channel access mode that the terminal equipment may adopt is identical), or may be per time-frequency resource configuration (per resource configuration) and/or per UL transmission type (that is, for different uplink transmission types and/or different time-frequency resource configurations, at least one channel access mode that may be used by the terminal equipment may be different).

In this case, before the terminal equipment transmits the first uplink transmission, according to time-frequency resource configuration to which the first time-frequency resource corresponds and/or an uplink transmission type to which the first uplink transmission corresponds, the terminal equipment may determine a channel access mode (or at least one channel access mode supported by the terminal equipment) in which the terminal equipment may transmit the first uplink transmission on the first time-frequency resource.

In some embodiments, the first channel access mode and/or the second channel access mode belong(s) to at least one channel access mode supported (or capable of being used) by the terminal equipment; for example, a channel access mode in the at least one channel access mode belonging to class 1 is referred to as a first channel access mode, and a channel access mode in the at least one channel access mode belonging to class 2 is referred to as a second channel access mode. The at least one channel access mode supported by the terminal equipment may be predefined or pre-configured, or may be indicated by a network device.

In this disclosure, the network device indication refers to indicating by the network device via higher layer signaling and/or physical layer signaling. The higher layer signaling is, for example, radio resource control (RRC) signaling (such as being referred to an RRC message, including, for example, an MIB, system information, a dedicated RRC message, or being referred to as an RRC IE (RRC information element)) and/or MAC (media access Control) signaling (or MAC IE (MAC information element)).

For example, the at least one channel access mode supported by the terminal equipment may be predefined according to the type of the uplink transmission, and channel access modes that may be adopted to which different uplink signal types correspond may be different. For example, if the uplink transmission is a CG PUSCH, the at least one channel access mode supported (or capable of being used) by the terminal equipment may include mode A and mode B, and if the uplink transmission is a PRACH, the at least one channel access mode supported (or capable of being used) by the terminal equipment may include mode A and mode C.

For another example, the at least one channel access mode supported by the terminal equipment may be indicated by the network device via higher layer signaling and/or physical layer signaling. In particular, for example, it may be indicated by the network device while indicating at least one semi-statically configured or semi-persistently scheduled time-frequency resource. For example, the first indication information includes an indication field, which is used to indicate at least one channel access mode in which the terminal equipment transmits uplink transmission on at least one semi-statically configured or semi-persistently scheduled time-frequency resource indicated by the first indication information. The indicated at least one channel access mode is the at least one channel access mode supported by the terminal equipment, or is a channel access mode capable of being used by the terminal equipment to transmit the first uplink on the first time-frequency resource.

If the channel access mode supported by the terminal equipment includes at least one channel access mode of class 1, as channel access of class 1 is a channel access mode for channel sharing and the terminal equipment is unable to predict whether the base station occupies the channel, whether the terminal equipment may transmit the uplink transmission by using one of the at least one channel access mode of class 1 is in dependence on dynamic indication of the base station.

In the embodiment of this disclosure, the network device may dynamically indicate the first starting position and/or the first channel access mode via physical layer signaling, which may not only guarantee that time interval between the uplink transmission and the other transmission (such as the previous uplink transmission) meets the requirements, but also support multiple channel access modes, thereby supporting transmission and reception of CG-based uplink signals satisfying requirements of NR-U.

In some embodiments, the physical layer signaling includes second indication information, the second indication information being used to indicate the first channel access mode and/or the first starting position. The second indication information may directly or indirectly indicate the first channel access mode and/or the first starting position.

For example, if the channel access mode supported by the terminal equipment includes only one channel access mode belonging to class 1 (that is, the channel access mode supported by the terminal equipment includes only one channel access mode for channel sharing), the second indication information may also indirectly indicate the first channel access mode adopted for transmitting the uplink transmission on the first time-frequency resource by indicating use of COT sharing on the first time-frequency resource.

For example, if the channel access mode supported by the UE only includes mode B but does not include other channel access modes belonging to class 1, or in other words, a channel access mode that may be used for the UE to transmit a PUSCH on the first time-frequency resource only includes mode B but does not include other channel access modes belonging to class 1, the second indication information indicates that the UE uses COT sharing on the first time-frequency resource, that is, indicating that mode B is used by the UE in transmitting a PUSCH on the first time-frequency resource.

In some embodiments, the physical layer signaling includes second indication information, the second indication information being used to indicate the first starting position, and third indication information included in the physical layer signaling or other physical layer signaling indicates the first channel access mode.

For example, the third indication information is transmitted via the physical layer signaling. The second indication information and the third indication information may be transmitted in the same physical layer signaling, or may be transmitted in different physical layer signaling. The physical layer signaling may be cell-specific, group-common, or device-specific (UE-specific); the physical layer signaling is, for example, information carried by DCI and/or a sequence.

In some embodiments, the second indication information indicates a first offset value of the first starting position relative to a second time position. The second time position may be within the time domain range of the one or more time domain resource(s); for example, the second time position is a starting position of a first symbol of the first time domain resource, or the second time position is a second starting position described below.

In some embodiments, there is a correspondence relationship between the first channel access mode and the first starting position, the correspondence relationship being pre-defined or pre-configured, or being indicated by a network device. The second indication information may indicate the first channel access mode and/or the first starting position based on the correspondence relationship. For example, if a first channel access mode corresponds to a unique first starting position, the second indication information may indirectly indicate the first starting position by indicating the first channel access mode, and if a first starting position corresponds to a unique first channel access mode, the second indication information may indirectly indicate the first channel access mode by indicating the first starting position.

For example, the first channel access mode may correspond to the first offset value, and the first channel access mode and the first starting position may be indicated by the second indication information.

Table 2 is an example of one-to-one correspondence between the first channel access mode and the first offset value; however, this disclosure is not limited to one-to-one correspondence, and other correspondence relationships may also be used.

TABLE 2

| First channel access modes | First offset value |
|---|---|
| mode B | 25 us |
| mode C | 16 us |
| mode D | 0 us |

In Table 2, the first channel access mode corresponds to the first offset value one to one. Therefore, the second indication information may only include the indication information of first channel access mode or the indication information of the first offset value. Based on the correspondence relationship, the UE may determine a corresponding first offset value or a corresponding first channel access mode.

For example, if the second indication information indicates mode B, the UE may learn that the first offset value is 25 us, and the UE may determine the first starting position according to the first offset value. Or, if the second indication information indicates that the first offset value is 25 us, the UE may learn that the first channel access mode is mode B.

For another example, the first channel access mode may correspond to a set of first offset values. Table 3 is an example of one-to-one correspondence between the first channel access mode and the set of first offset values; however, this disclosure is not limited to one-to-one correspondence, and other correspondence relationships may also be used.

TABLE 3

| First channel access modes | Set of first offset values |
|---|---|
| mode B | 25 us, 25 us + TA |
| mode C | 16 us, 16 us + TA |
| mode D | 0 us |

In Table 3, one first channel access mode corresponds to one set of first offset values, and one first offset value corresponds to one first channel access mode. Therefore, the second indication information may only include the indication information of the first channel access mode, and based on the correspondence relationship, the UE may determine a corresponding set of first offset values, and further determine a first offset value according to the third indication information. At this moment, the third indication information may indicate a first offset value in a corresponding set of first offset values. Alternatively, the second indication information may only include the indication information of the first offset value, hence, based on the correspondence relationship, the UE may determine a corresponding first channel access mode.

The above example of the values of the first offset values may be such that the time interval between the uplink transmission and the previous transmission is not greater than 25 us; however, this disclosure is not limited thereto. Although NR_U may support two or more times of uplink and downlink conversion in a COT, but according to implementations of the base station, a cell may also support that a COT includes one time of uplink and downlink conversion. In a COT including one time of uplink and downlink conversion, a requirement for a time interval between adjacent transmissions may be more relaxed. Therefore, in order to increase network flexibility, a second offset value may also be greater than 25 us. For example, assuming that a subcarrier spacing is 15 kHz, a value range of the first offset value is {16 us, 25 us, 34 us, 43 us, 52 us, 61 us, 1 symbol}.

In some embodiments, if the first time-frequency resource is within a channel occupation time including at least two times of uplink and downlink conversion and the terminal equipment transmits the uplink signal by using the first channel access mode on the first time-frequency resource, the first offset value should make the time interval between the uplink transmission and the previous transmission meet the requirements. For example, assuming that the time interval should not be greater than 25 us, the first offset value should not be greater than 25 us.

For example, if the base station indicates that the uplink transmission by the UE adopts the channel access mode of class 1 in a COT including two or more times of uplink and downlink conversion, the first offset value needs to be ensured to be not greater than 25 us.

It is should be noted that the correspondence relationship between the first channel access mode and the first offset value or the set of first offset values may be predefined or pre-configured, or may be indicated by a network device (such as a base station), the above description is exemplary only, and this disclosure is not limited thereto.

In some embodiments, the terminal equipment may transmit the uplink signal starting from the first starting position on the first time-frequency resource by using the first channel access mode. The terminal equipment may also transmit the uplink signal starting from the second starting position on the first time-frequency resource by using the second channel access mode.

In some embodiments, when a determination condition is satisfied, the terminal equipment transmits the uplink signal starting from the first starting position on the one or more time-frequency resources by using the first channel access mode; and when the determination condition is not satisfied, the terminal equipment transmits the uplink signal starting from a second starting position on the one or more time-frequency resources by using the second channel access mode, wherein the second starting position within the time-frequency range of the one or more time-frequency resources is predefined or pre-configured, or is indicated by the network device (such as via higher layer signaling).

In some embodiments, the determination condition may include that: whether the physical layer signaling is received no later than a first time position of the one or more time-frequency resources. A time interval between the first time position and a starting position of a first time-frequency resource of the one or more time-frequency resources is not less than a preparation time of the uplink signal, or, a time interval between the first time position and the second starting position is not less than a preparation time of the uplink signal. However, the embodiments of this disclosure is not limited thereto, they may also adopt other determination conditions.

Figure 9:
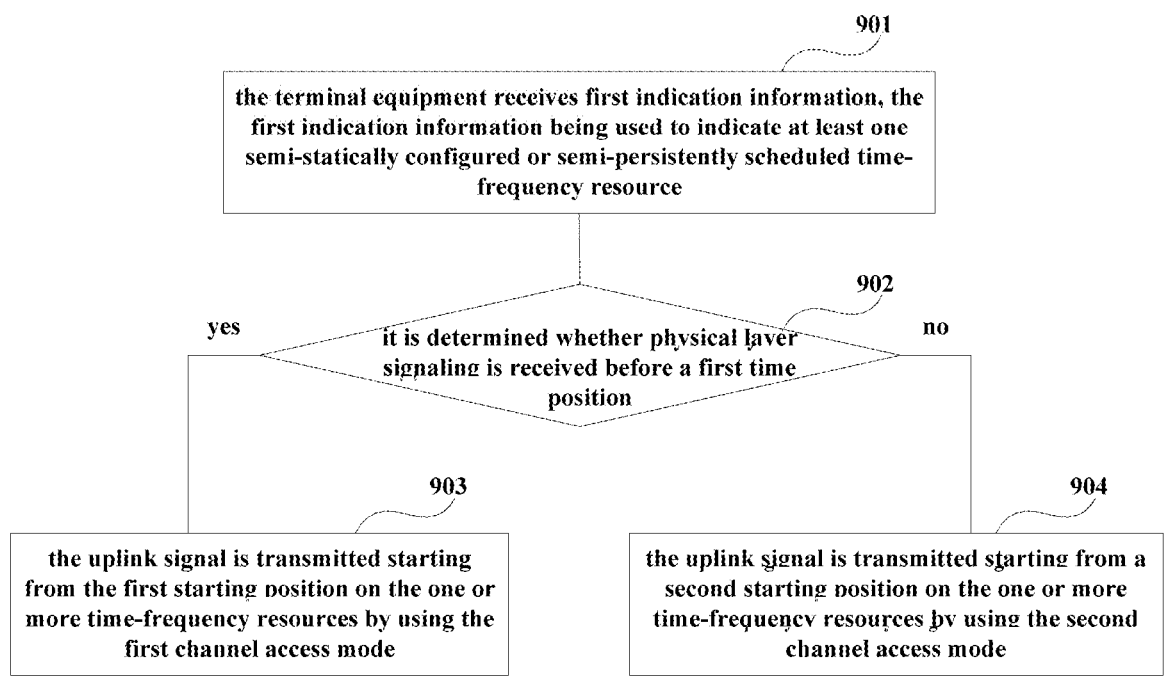
FIG. 9 is another schematic diagram of a method for transmitting an uplink signal of the embodiments of this disclosure.

FIG. 9 is another schematic diagram of a method for transmitting an uplink signal of the embodiments of this disclosure, which shall be described by taking that the terminal equipment supports at least one first channel access mode and at least one second channel access mode as an example. As shown in FIG. 9, the method includes:

901: the terminal equipment receives first indication information, the first indication information being used to indicate at least one semi-statically configured or semi-persistently scheduled time-frequency resource;

902: it is determined whether physical layer signaling is received before a first time position, the physical layer signaling being used to indicate a first starting position within a time domain range of one or more time-frequency resources in the at least one time-frequency resource; if yes, executing 903, otherwise executing 904;

903: the uplink signal is transmitted starting from the first starting position on the one or more time-frequency resources by using the first channel access mode; and

904: the uplink signal is transmitted starting from a second starting position on the one or more time-frequency resources by using the second channel access mode, wherein the second starting position within the time domain range of the one or more time-frequency resources is pre-defined or pre-configured, or is indicated by a network device (such as via higher layer signaling and/or physical layer signaling).

For example, an RRC message including the above first indication information may include indication information indicating the second starting position. For another example, for a case of semi-persistent scheduling, physical layer signaling including the above first indication information may include indication information indicating the second starting position.

It should be noted that FIG. 9 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 9.

In some embodiments, the second starting position is predefined or pre-configured.

For example, the UE selects a second offset value from a predefined set of second offset values, so that the second starting position may be determined according to the selected second offset value. The second offset value may be an offset value relative to a starting position of a first symbol of the first time-frequency resource.

In some embodiments, the second starting position is indicated by the network device via fourth indication information, wherein the fourth indication information is used to indicate a second offset value of the second starting position relative to a starting position of a first symbol of the one or more time-frequency resources, or is used to indicate a set of second offset values.

For example, the fourth indication information may indicate a second offset value, and the UE may determine the second starting position according to the second offset value; or, the fourth indication information may indicate a set of second offset values, and the UE selects a second offset value from the set of second offset values, and may determine the second starting position according to the selected second offset value.

The channel access modes and starting positions of this disclosure are schematically described above, and the subcarrier spacing shall be described below.

In some embodiments, the subcarrier spacing (SCS) of the one or more time-frequency resources is one of at least two types of subcarrier spacings, and the terminal equipment determines the first starting position and/or the second starting position according to the subcarrier spacing of the one or more time-frequency resources.

In some embodiments, at least two subcarrier spacings correspond to different first starting positions, and/or at least two subcarrier spacings correspond to different second starting positions.

For example, the first offset value and the second offset value may be characterized by numbers of symbols and/or time lengths, such as 1 symbol, 1 symbol+X us, Y us. More than one SCSs may be supported in NR_U, such as 15 kHz, 30 kHz, 60 kHz, and 120 kHz. Time lengths of a symbol of different SCSs are different. In order to meet identical requirements for time intervals, first offset values or second offset values required by different SCSs may be different.

In some embodiments, at least two types of subcarrier spacings correspond to different first offset values, and/or, at least two types of subcarrier spacings correspond to different second offset values.

A second offset value is taken as an example. Value ranges of second offset values to which different subcarrier spacings correspond may be different, and the value ranges may be predefined, such as example 1 and example 2.

Example 1

| SCS | Value ranges of second offset values |
|---|---|
| 15 kHz | {16 us, 25 us, 34 us, 43 us, 52 us, 61 us, 1 symbol} |
| 30 kHz | {16 us, 25 us, 34 us, 43 us, 52 us, 61 us, 2 symbols} |
| 60 kHz | {16 us, 25 us, 34 us, 43 us, 52 us, 61 us, 4 symbols} |

Example 2

| SCS | Value ranges of second offset values |
|---|---|
| 15 kHz | {16 us, 25 us, 34 us, 43 us, 52 us, 61 us, 1 symbol} |
| 30 kHz | {16 us, 25 us, 1 symbol} |

For another example, if the second offset value or the set of second offset values is indicated by the fourth indication information, in order to save signaling overhead, the fourth indication information may indicate the second offset value or the set of second offset values based on a correspondence relationship between subcarrier spacings and the value range of the second offset value. After receiving the fourth indication information, the UE may determine the second offset value or the set of second offset values indicated by the fourth indication information according to the subcarrier spacing of the first time-frequency resource, such as example 3 and example 4.

Example 3

| | Indicating the second offset value by the fourth indication information | | | | | | | |
|---|---|---|---|---|---|---|---|---|
| SCS | 000 | 001 | 010 | 011 | 100 | 101 | 110 | 111 |
| 15 kHz | 16 us | 25 us | 34 us | 43 us | 52 us | 61 us | 1 symbol | x |
| 30 kHz | 16 us | 25 us | 34 us | 43 us | 52 us | 61 us | 2 symbols | x |

According to example 3, if information bits included in the fourth indication information received by the UE are 110, if the subcarrier spacing of the first time-frequency resource is 15 kHz, the second offset value is 1 symbol, and if the subcarrier spacing of the frequency resource is 30 kHz, and the second offset value is 2 symbols.

Example 4

| | Indicating the second offset value by the fourth indication information | | | | | | | |
|---|---|---|---|---|---|---|---|---|
| SCS | 000 | 001 | 010 | 011 | 100 | 101 | 110 | 111 |
| 15 kHz | 16 us | 25 us | 34 us | 43 us | 52 us | 61 us | 1 symbol | x |
| 30 kHz | 16 us | 25 us | 1 symbol | x | x | x | x | x |

According to example 4, if information bits included in the fourth indication information received by the UE are 010, if the subcarrier spacing of the first time-frequency resource is 15 kHz, the second offset value is 34 us, and if the subcarrier spacing of the frequency resource is 30 kHz, and the second offset value is 1 symbol.

In some embodiments, at least two types of subcarrier spacings correspond to different sets of first offset values, and/or, at least two types of subcarrier spacings correspond to different sets of second offset values.

A set of second offset value is taken as an example, as shown in example 5 and example 6 below.

Example 5

| | Indicating the set of second offset values (e.g. bitmap) by the fourth indication information | | | | | | |
|---|---|---|---|---|---|---|---|
| SCS | 0/1 | 0/1 | 0/1 | 0/1 | 0/1 | 0/1 | 0/1 |
| 15 kHz | 16 us | 25 us | 34 us | 43 us | 52 us | 61 us | 1 symbol |
| 30 kHz | 16 us | 25 us | 34 us | 43 us | 52 us | 61 us | 2 symbols |

According to example 5, if information bits included in the fourth indication information received by the UE are 1110001, if the subcarrier spacing of the first time-frequency resource is 15 kHz, the set of second offset values is {16 us, 25 us, 34 us, 1 symbol}, and if the subcarrier spacing of the frequency resource is 30 kHz, the set of second offset values is {16 us, 25 us, 34 us, 2 symbol}.

Example 6

| | Indicating the set of second offset values (e.g. bitmap) by the fourth indication information | | | | | | |
|---|---|---|---|---|---|---|---|
| SCS | 0/1 | 0/1 | 0/1 | 0/1 | 0/1 | 0/1 | 0/1 |
| 15 kHz | 16 us | 25 us | 34 us | 43 us | 52 us | 61 us | 1 symbol |
| 30 kHz | 16 us | 25 us | 34 us | 1 symbol | x | x | x |

According to example 6, if information bits included in the fourth indication information received by the UE are 1110001, if the subcarrier spacing of the first time-frequency resource is 15 kHz, the set of second offset values is {16 us, 25 us, 34 us, 1 symbol}, and if the subcarrier spacing of the frequency resource is 30 kHz, the set of second offset values is {16 us, 25 us, 34 us}.

In some embodiments, the reference subcarrier spacing corresponds to the first offset value, or the reference subcarrier spacing corresponds to the set of first offset values; and/or; the reference subcarrier spacing corresponds to the second offset value, or the reference subcarrier spacing corresponds to the set of second offset values.

The second offset value is taken as an example. The fourth indication information indicates the first offset value or the set of first offset values based on the reference subcarrier spacing, and the reference subcarrier spacing may be pre-defined or may be indicated by the base station. The UE determines the second offset value or the set of second offset values according to the subcarrier spacing of the first time-frequency resource, such as example 7 and example 8.

Example 7

| Reference | Indicating the second offset value by the fourth indication information | | | | | | | |
|---|---|---|---|---|---|---|---|---|
| SCS | 000 | 001 | 010 | 011 | 100 | 101 | 110 | 111 |
| 15 kHz | 16 us | 25 us | 34 us | 43 us | 52 us | 61 us | 1 symbol | x |

According to example 7, if information bits included in the fourth indication information received by the UE are 110, if the subcarrier spacing of the first time-frequency resource is 15 kHz, the second offset value is 1 symbol, and if the subcarrier spacing of the frequency resource is 30 kHz, and the second offset value is 2 symbols.

Example 8

| Reference | Indicating the set of second offset values (e.g. bitmap) by the fourth indication information | | | | | | |
|---|---|---|---|---|---|---|---|
| SCS | 0/1 | 0/1 | 0/1 | 0/1 | 0/1 | 0/1 | 0/1 |
| 15 kHz | 16 us | 25 us | 34 us | 43 us | 52 us | 61 us | 1 symbol |

According to example 8, if information bits included in the fourth indication information received by the UE are 1110001, if the subcarrier spacing of the first time-frequency resource is 15 kHz, the set of second offset values is {16 us, 25 us, 34 us, 1 symbol}, and if the subcarrier spacing of the frequency resource is 30 kHz, the set of second offset values is {16 us, 25 us, 34 us, 2 symbol}.

Effect of the subcarrier spacings on the starting positions are schematically described above, and generation of the uplink signal shall be described below.

In some embodiments, the terminal equipment generates the uplink signal according to the subcarrier spacing of the first time-frequency resource and/or the adopted channel access mode.

For example, it is assumed that l characterizes a symbol index in a subframe, $l \in \{0, 1, N_{slot}^{subframe,\mu} \cdot N_{symb}^{slot} - 1\}$, $N_{slot}^{subframe,\mu} \cdot N_{symb}^{slot}$ is the number of symbols in a subframe; where, $N_{symb}^{slot}$ is the number of symbols in a slot, and $N_{slot}^{subframe,\mu}$ is the number of slots in a subframe corresponding to a subcarrier spacing. For example,

TABLE 4

| μ (SCS) | $N_{slot}^{subframe,\mu}$ | $N_{slot}^{subframe,\mu} \cdot N_{symb}^{slot}$ |
|---|---|---|
| 0 (15 kHz) | 1 | 14 |
| 1 (30 kHz) | 2 | 28 |
| 2 (60 kHz) | 4 | 56 |
| 0 (120 kHz) | 8 | 112 |

$t_{length,l}^{\mu}$ and $t_{CP,l}^{\mu}$ are symbol length and CP length to which symbol l corresponds respectively. Taking NCP as an example, $$t_{length,l}^{\mu} = 2048 \cdot k \cdot 2^{-\mu} \cdot T_c,$$

$$t_{CP,l}^{\mu} = \begin{cases} (144 \cdot k \cdot 2^{-\mu} + 16 \cdot k) \cdot T_c, & l = 0 \text{ or } l = 7 \cdot 2^{\mu} \\ 144 \cdot k \cdot 2^{-\mu} \cdot T_c, & l \neq 0 \text{ or } l \neq 7 \cdot 2^{\mu} \end{cases}$$

In some embodiments, according to the subcarrier spacing of the one or more time-frequency resources, the terminal equipment determines a first symbol in the one or more time-frequency resources capable of transmitting the uplink signal and a starting position of a part of the first symbol capable of transmitting the uplink signal.

For example, the first offset value and the second offset value may be characterized by the number of symbols and/or a time length. If the first offset value or the second offset value is characterized by the time length, the UE may need to determine the first starting position or the second starting position according to the SCS of the first time-frequency resource, or in other words, determine a first symbol capable of performing transmission in the first time-frequency resource and a length of the first symbol capable of performing transmission (and/or a starting position of a part of the first symbol capable of transmitting an uplink signal).

Assuming that a symbol $l_0$ is the first symbol of the first time-frequency resource and the first offset value or the second offset value is characterized by the time length, denoted by $t_{offset}$, the first symbol $l_{start}$ capable of performing transmission in the first time-frequency resource and the starting position of the part capable of performing transmission in the symbol $l_{start}$ (characterized a offset value $t_{offset,l_{start}}^{\mu}$ relative to the starting position of the first symbol $l_{start}$) are, for example, $$l_{start} = l_0 + \left\lfloor \frac{t_{offset}}{t_{length}^{\mu}} \right\rfloor,$$

-continued $$t^{\mu}_{offset,l_{start}} = \begin{cases} t_{offset} & l_{start} = l_0 \\ t_{offset} - \sum_{l=l_0}^{l_{start}-1} t^{\mu}_{length,l} + t^{\mu}_{CP,l} & l_{start} \neq l_0 \end{cases};$$

where, $t_{length}{}^{\mu}$ denotes the reference symbol length to which the SCS of the first time-frequency resource corresponds, for example, $$t_{length}{}^{\mu} = 2048 \cdot k \cdot 2^{-\mu} \cdot T_c + 144 \cdot k \cdot 2^{-\mu} \cdot T_c.$$

On the other hand, if the first offset value or the second offset value is indicated based on a reference SCS, and the first offset value is characterized by the number of symbols, or the number of symbols and the length of time, the UE needs to determine $l_{start}$ and/or $t_{offset,l_{start}}{}^{\mu}$ according to the reference subcarrier spacing and the subcarrier spacing of the first time-frequency resource.

Assuming that the reference subcarrier spacing is $\mu_0$, for example, the first offset value or the second offset value is characterized by the number of symbols, $N_{offset}$, then, $$l_{start} = l_0 + \left\lfloor \frac{N_{offset} \cdot t_{length}^{\mu_0}}{t_{length}^{\mu}} \right\rfloor,$$

$$t^{\mu}_{offset,l_{start}} = \begin{cases} N_{offset} \cdot t_{length}^{\mu_0} & l_{start} = l_0 \\ N_{offset} \cdot t_{length}^{\mu_0} - \sum_{l=l_0}^{l_{start}-1} t^{\mu}_{length,l} + t^{\mu}_{CP,l} & l_{start} \neq l_0 \end{cases}.$$

For another example, the first offset value or the second offset value is characterized by the number of symbols and the time length $N_{offset} + t_{offset}$, then, $$l_{start} = l_0 + \left\lfloor \frac{N_{offset} \cdot t_{length}^{\mu_0} + t_{offset}}{t_{length}^{\mu}} \right\rfloor,$$

$$t^{\mu}_{offset,l_{start}} = \begin{cases} N_{offset} \cdot t_{length}^{\mu_0} + t_{offset} & l_{start} = l_0 \\ N_{offset} \cdot t_{length}^{\mu_0} + t_{offset} - \sum_{l=l_0}^{l_{start}-1} t^{\mu}_{length,l} + t^{\mu}_{CP,l} & l_{start} \neq l_0 \end{cases}.$$

According to $t_{offset,l_{start}}{}^{\mu}$, a signal to which the symbol $l_{start}$ corresponds is, for example, $$s_{l_{start}}^{(p,\mu)}(t) = \begin{cases} 0 & 0 \leq t < t^{\mu}_{offset,l_{start}} \\ -s_{l_{start}+1}^{(p,\mu)}(t - t^{\mu}_{CP,l_{start}}) & t^{\mu}_{offset,l_{start}} \leq t < t^{\mu}_{length,l_{start}} + t^{\mu}_{CP,l_{start}} \end{cases},$$

or, $$s_{l_{start}}^{(p,\mu)}(t) = \begin{cases} 0 & 0 \leq t < t^{\mu}_{offset,l_{start}} \\ s_{l_{start}+1}^{(p,\mu)}(t - t^{\mu}_{CP,l_{start}}) & t^{\mu}_{offset,l_{start}} \leq t < t^{\mu}_{length,l_{start}} + t^{\mu}_{CP,l_{start}} \end{cases};$$

wherein whether the first offset value or the second offset value is used is as described above. Resource mapping shall be described below by taking a CG PUSCH as an example.

In some embodiments, the terminal equipment maps the first uplink information according to at least one piece of the following information or any combination thereof: the sub-carrier spacing of the one or more time-frequency resources, a used channel access mode, instruction information used for instructing to map a symbol position of first uplink information. The terminal equipment may map the first uplink information to one or more complete symbols in the time-frequency resource, and the complete symbols may use all the time for transmitting the uplink signal.

For example, if the first uplink transmission is a CG PUSCH, UCI (such as CG-UCI) may need to be carried in the first uplink transmission, and the UCI (first uplink information) may be used to indicate an HARQ (process) ID, NDI, and RV, etc., to which the uplink transmission corresponds, and this is essential for the base station to correctly receive the uplink transmission; however, this disclosure is not limited thereto. For another example, the first uplink information may also be other UCI, such as carrying at least one of the following: an SR, HARQ-ACK, CSI.

On the one hand, as described above, in order to ensure that there is an appropriate time interval between the first uplink transmission and the previous transmission, a former part of symbols in the first time-frequency resource may possibly not transmit a signal or is unable to transmit a signal completely. On the other hand, if it is needed to support that next transmission of the first uplink transmission is able to continue to share the same COT for transmission, in order to ensure that there is an appropriate time interval between the first uplink transmission and the next transmission, a latter part of the symbols in the first time-frequency resource may possibly not be transmitted or is unable to be transmitted completely. To ensure the base station is able to receive the UCI correctly, it is needed to avoid mapping the above UCI on symbols in the first time-frequency resource that are not able to be transmitted or unable to be completely transmitted.

Figure 10:
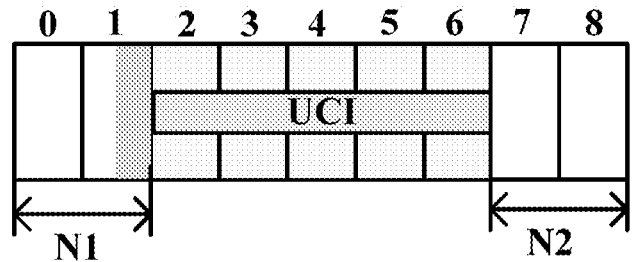
FIG. 10 is an exemplary diagram of a first time-frequency resource of the embodiments of this disclosure.

FIG. 10 is an exemplary diagram of the first time-frequency resource of the embodiments of this disclosure. For example, as shown in FIG. 10, it is supposed that the first symbol of the first time-frequency resource is 0 and the last symbol thereof is 8, wherein former N1=2 symbols and latter N2=2 symbols do not transmit signals or transmit signals incompletely, and the UCI may be mapped onto symbols 2-6.

In some embodiments, for at least two subcarrier spacings and/or at least two channel access modes, symbol positions for mapping the first uplink information in the time-frequency resources are at least partially different.

For example, as different SCSs correspond to different symbol lengths, numbers of symbols not transmitting a signal or unable to completely transmit a signal to which different SCSs correspond may be different. Therefore, for different SCS, symbol positions available for mapping UCI may be different.

In some embodiments, the position of the symbol mapping the first uplink information in the time-frequency resource is predefined, or is preconfigured or indicated by the network device.

For example, the symbol positions that may be used for mapping UCI in the first time-frequency resource may be predefined or preconfigured or indicated by the base station, or the symbol positions unable to be used for mapping UCI in the first time-frequency resource may be predefined or preconfigured, or may be indicated by the base station.

For example, for different SCSs, the symbol positions able be used for mapping UCI may be pre-defined or preconfigured respectively. In particular, numbers of symbols unable to be used for mapping UCI are predefined for different SCSs, as shown in Table 5 below.

TABLE 5

| SCS | N1 | N2 |
| --- | --- | --- |
| 15 kHz | 1 | 1 |
| 30 kHz | 2 | 2 |

For another example, if value ranges of the first/second offset values to which different SCSs correspond are respectively predefined or preconfigured, the number of symbols unable to be used for mapping UCI may correspond to the predefined value ranges of the first/second offset values. For example, if the value range of the first offset value is predefined as {16 us, 25 us, 34 us, 43 us, 52 us, 61 us, 1 symbol} for a subcarrier spacing of 15 kHz and the value range of the first offset value is predefined as {16 us, 25 us, 34 us, 43 us, 52 us, 61 us, 2 symbol} for a subcarrier spacing of 30 kHz, for 15 kHz, former 1 symbol is not used for mapping UCI, and for 30 kHz, former 2 symbols are not used for mapping UCI.

For another example, the value ranges of the first/second offset values are predefined or preconfigured based on a reference subcarrier spacing; for example, if the value range of the first offset value is predefined as {16 us, 25 us, 34 us, 43 us, 52 us, 61 us, 1 symbol} for a reference subcarrier spacing of 15 kHz, for 15 kHz, former 1 symbol is not used for mapping UCI, and for 30 kHz, former 2 symbols are not used for mapping UCI.

In this way, the UE may map UCI onto symbols available for mapping UCI in the first time-frequency resource according to the subcarrier spacing of the first time-frequency resource.

For a case of direct indication by the base station, for different SCSs, the symbol positions able to be used for mapping UCI may be indicated respectively, such as indicating value(s) of N1 and/or N2. Or, the symbol positions able to be used for mapping UCI is indicated based on a reference subcarrier spacing.

For a case of indirect indication by the base station, the base station may indirectly indicate the symbol positions able to be used for mapping UCI by indicating the set(s) of first/second offset value(s). A relationship between the indicated set(s) of first/second offset value(s) and the symbol positions able to be used for mapping UCI may be similar to the relationship between the above predefined value range(s) of first/second offset value(s) and the symbol positions available for mapping UCI.

Alternatively, the base station may indirectly indicate the symbol positions able to be used for mapping UCI by indicating the first/second offset value(s). For example, if the indicated first offset value is 43 us, and if the subcarrier spacing of the first time-frequency resource is 15 kHz, former 1 symbol is not used for mapping UCI, and if the subcarrier spacing is 30 kHz, former 2 symbols are not used for mapping UCI (which is similar to a method for signal generation, in which a first completely transmitted symbol in the first time-frequency resource may be determined).

In some embodiments, as described above, class 1 and class 2 have different requirements for time intervals between adjacent transmissions, and class 1 and class 2 may also correspond to different symbol positions able to be used for mapping UCI. In addition, different channel access modes in class 1 may have different requirements for time intervals between adjacent transmissions. Therefore, symbol positions able to be used for mapping UCI to which different channel access modes correspond may be different.

For example, the symbol position able to be used for mapping UCI to which the first channel access mode corresponds is, for example, determined according to the predefined value range of the first offset value or the indicated first offset value or set of first offset values. And the symbol position able to be used for mapping UCI to which the second channel access mode corresponds is, for example, determined according to the predefined value range of the second offset value or the indicated second offset value or set of second offset values.

In this case, the UE may need to determine the symbol positions in the first time-frequency resource able to be used for mapping UCI according to the channel access mode adopted for the first uplink transmission. For example, if the second channel access mode is adopted, the symbol positions able to be used for mapping UCI in the first time-frequency resource are the symbol positions able to be used for mapping UCI to which the second channel access mode corresponds. If the second indication information is received indicating that the first channel access mode is adopted, the symbol positions able to be used for mapping UCI in the first time-frequency resource are the symbol positions able to be used for mapping UCI to which the first channel access mode corresponds.

For another example, as the UE needs to receive the second indication information, the UCI is mapped onto an appropriate symbol position. In order for the UE to have enough time to prepare the PUSCH, the physical layer signaling used to transmit corresponding first indication information should be transmitted before a certain time length of the first time-frequency resource.

That is, for the UE, the UE receives the physical layer signaling before the first time position. There is a time interval between the first time position and the starting position of the first symbol of the first time-frequency resource. The time interval should not be less than the time required by the UE to prepare the PUSCH. If the UE does not receive the physical layer signaling, it may map the UCI according to the symbol position able to be used for mapping UCI to which the second channel access mode corresponds; if the UE receives the physical layer signaling, it may map the UCI according to the symbol position able to be used for mapping UCI to which the first channel access mode corresponds.

In some embodiments, the uplink signal also carries second uplink information, the second uplink information being used to indicate an ending position of the uplink signal.

In some embodiments, for at least two subcarrier spacings, the ending positions of the uplink signal indicated by the second uplink information are different.

For example, in order to enable the base station to transmit downlink transmission by using COT sharing after the first uplink transmission, the UCI may possibly further include indication information indicating an ending position of the first uplink transmission. In order to save signaling overhead, ending positions indicated by identical indication information for different SCSs may be different, as shown in Table 6 below.

TABLE 6

| SCS | Indication information | |
|---|---|---|
| | 0 | 1 |
| 15 kHz | Last symbol of the first time-frequency resource | Last symbol but one of the first time-frequency resource |
| 30 kHz | Last symbol of the first time-frequency resource | Last symbol but one of the first time-frequency resource |
| 60 kHz | Last symbol of the first time-frequency resource | Last symbol but two of the first time-frequency resource |

Correspondingly, after receiving the UCI, the base station needs to determine the ending position of the first uplink transmission according to the subcarrier spacing of the first time-frequency resource.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that by indicating the first starting position in the time domain range of one or more semi-statically configured or semi-persistently scheduled time-frequency resources via physical layer signaling and using the first starting position to transmit an uplink signal, transmission and reception of a CG-based uplink signal satisfying NR-U requirements, or transmission and reception of other uplink signals on semi-statically configured or semi-persistently scheduled time-frequency resources, may be supported.

Embodiments of a Second Aspect

The embodiments of this disclosure provide a method for transmitting an uplink signal, which shall be described from a terminal equipment side. The embodiments of this disclosure may be combined with the embodiments of the first aspect, or may be implemented separately, and contents identical to those in the embodiments of the first aspect shall not be described herein any further.

Figure 11:
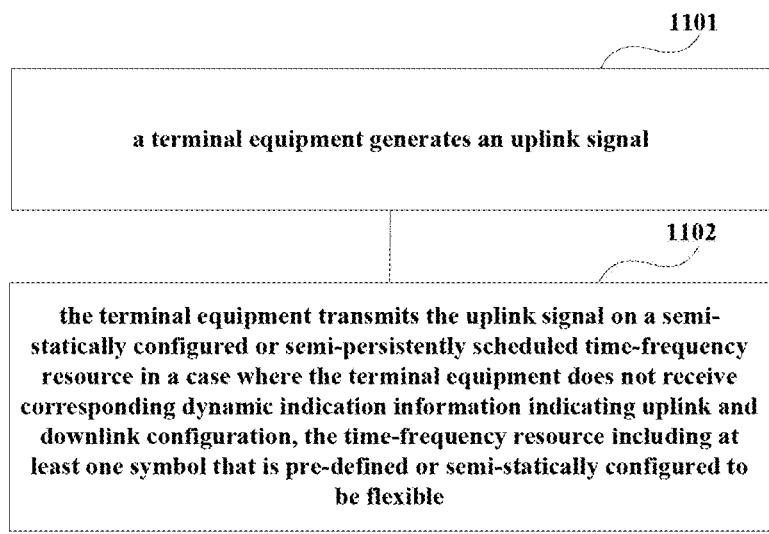
FIG. 11 is a further schematic diagram of a method for transmitting an uplink signal of the embodiments of this disclosure.

FIG. 11 is a schematic diagram of a method for transmitting an uplink signal of the embodiment of this disclosure. As shown in FIG. 11, the method includes:

1101: a terminal equipment generates an uplink signal; and

1102: the terminal equipment transmits the uplink signal on a semi-statically configured or semi-persistently scheduled time-frequency resource in a case where the terminal equipment does not receive corresponding dynamic indication information indicating uplink and downlink configuration, the time-frequency resource including at least one symbol that is pre-defined or semi-statically configured to be flexible.

It should be noted that FIG. 11 only schematically illustrates the embodiments of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 11.

Compared with LTE, NR supports more flexible uplink and downlink configuration. The uplink and downlink configuration may be semi-statically configured and/or dynamically configured. Dynamic configuration is indicated via DCI format 2-0. In NR, a UE needs to determine whether it may transmit uplink transmission on a semi-statically configured or semi-persistently scheduled time-frequency resource according to the uplink and downlink configuration.

For example, if the base station configures that the UE monitors a PDCCH to receive DCI format 2_0, for a semi-statically configured or semi-persistent scheduled time-frequency resource including at least one symbol that is semi-statically configured as being flexible, if the UE does not receive DCI format 2_0 indicating that the symbol is of uplink, the UE is unable to transmit uplink transmission at this time-frequency resource. This is mainly to avoid interference to other devices.

The case where the UE does not receive the DCI format 2_0 indicating that the symbol is of uplink may be divided into two types: not receiving corresponding DCI format 2_0; and receiving corresponding DCI format 2_0 not indicating that the symbol is of uplink; for example, it indicates that the symbol is of D/F, or it does not indication configuration of the symbol.

Figure 12:
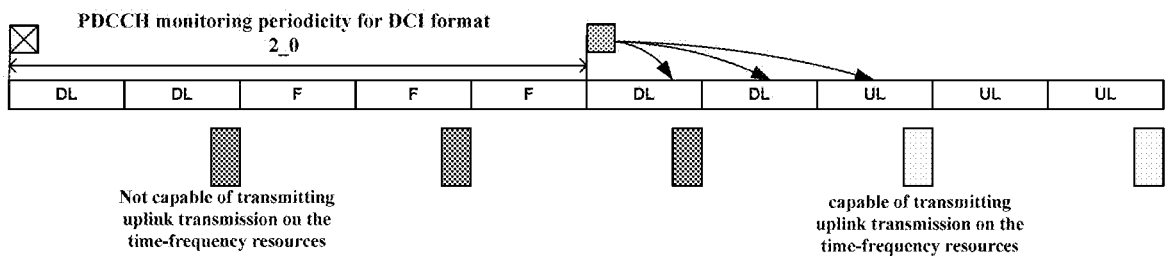
FIG. 12 is an exemplary diagram of uplink and downlink configuration of NR.

FIG. 12 is an exemplary diagram of uplink and downlink configuration of NR. As shown in FIG. 12, a resource may be configured to be of uplink (UL), downlink (DL) or flexible (F) via cell common uplink and downlink configuration information (tdd-UL-DL-ConfigurationCommon) and/or device dedicated uplink and downlink configuration information (tdd-UL-DL-ConfigurationDedicated), and flexible (F) may further be configured to be of uplink (UL) or downlink (DL) via dynamic signaling (DCI format 2_0).

As shown in FIG. 12, if corresponding dynamic signaling (DCI format 2_0) (denoted by ☒ in FIG. 12) is not received at former 5 time units (semi-statically configured as DDFFF), the uplink transmission configured by higher layer signaling may not be transmitted on F. And if corresponding dynamic signaling (DCI format 2_0) (denoted by ☐ in FIG. 12) is received at latter 5 time units (semi-statically configured as FFFUU) and is further configured as DDUUU, the uplink transmission configured by higher layer signaling may be transmitted on U.

On unlicensed frequency bands, flexible uplink and downlink configurations may make a base station and UE have more channel access opportunities. Therefore, the base station may only use a dynamically configured mode, or configure more flexible symbols semi-statically, which leads to that all or most semi-statically configured or semi-persistently scheduled time-frequency resources include flexible symbols.

However, the base station may not be able to transmit the PDCCH carrying DCI format 2_0 due to a channel access failure, and the UE may not receive the DCI format 2_0. According to the scheme in NR, the UE will not be able to transmit the above uplink transmission. In other words, whether the UE is able to transmit uplink transmission that is not based on dynamic scheduling is still limited by the dynamic indication of the base station, which may result in degradation of efficiency of the uplink transmission and possible increase of latency.

In the embodiment of this disclosure, for example, taking into account that channel detection may avoid interference to other devices to some extent, in order to improve the efficiency of uplink transmission and lower latency, it is permitted that the UE transmits uplink transmission on the semi-statically configured or semi-persistently scheduled time-frequency resource including symbols that are semi-statically configured as being flexible in a case where the UE does not receive corresponding dynamic indication information (which may be, for example, DCI format 2_0, or may also be a newly-defined DCI format) used for indicating the uplink and downlink configurations.

Figure 13:
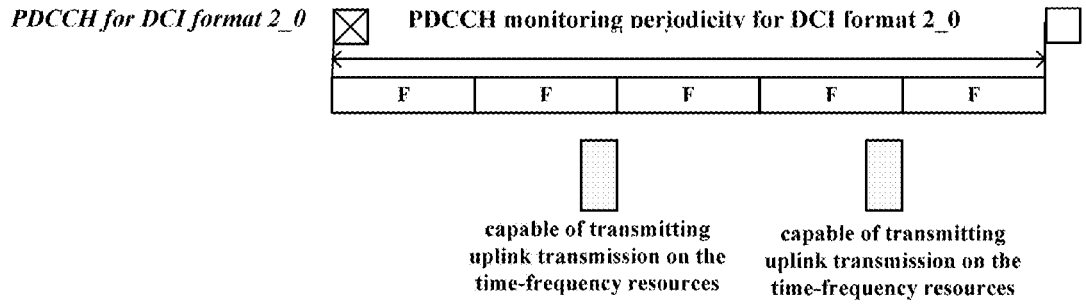
FIG. 13 is an exemplary diagram of uplink and downlink configuration of the embodiments of this disclosure.

FIG. 13 is an exemplary diagram of the uplink and downlink configuration of the embodiment of this disclosure. As shown in FIG. 13, for example, in a case where the UE does not receive corresponding DCI format 2_0 (denoted by ✉ in FIG. 13), the UE may transmit the uplink signal at a time unit that is predefined or semi-statically configured as being flexible (F).

It should be noted that schematic description is given in FIGS. 12 and 13 only. The time units to which UL, DL and F in FIG. 12 or FIG. 13 correspond may be a number of slots, or may be multiple symbols, or may be other time lengths, which do not strictly correspond to one slot.

In addition, the semi-static configuration information in FIGS. 12 and 13, such as tdd-UL-DL-ConfigurationCommon and/or device-specific uplink and downlink configuration information (tdd-UL-DL-ConfigurationDedicated) and dynamic signaling DCI format 2_0, are only examples in this disclosure. However, this disclosure is not limited thereto, and they may also be other semi-statically configured information and/or dynamic signaling, or may be newly defined semi-statically configured information and/or dynamic signaling.

In some embodiments, whether the terminal equipment is allowed to transmit the uplink signal on one or more symbols that are predefined or semi-statically configured as being flexible in a case where the terminal equipment does not receive corresponding dynamic indication information indicating uplink and downlink configuration is pre-defined or preconfigured, or is indicated by the network device (for example, configured by the higher layer signaling).

In some embodiments, whether the terminal equipment is allowed to transmit the uplink signal on the one or more symbols that are predefined or semi-statically configured as being flexible in a case where the terminal equipment does not receive the corresponding dynamic indication information indicating uplink and downlink configuration is pre-defined or preconfigured, or is indicated by the network device (for example, configured by the higher layer signaling) for a type of the uplink signal.

If the terminal equipment is allowed to transmit the uplink signal on one or more symbols that are predefined or semi-statically configured as being flexible, assuming that the first time-frequency resource includes symbols that are semi-statically configured as being flexible, in the case of not receiving DCI format 2_0, the UE may transmit the first uplink transmission on the first time-frequency resource. For example, it transmits the uplink transmission starting from the second starting position on the first time-frequency resource in the second channel access mode. For another example, the UE may perform uplink transmission on the first time-frequency resource according to the embodiments of the first aspect.

Or, it is assumed that the first DCI at least includes second indication information, and the second DCI at least includes indication information for dynamically indicating uplink and downlink configuration. If the UE receives the first DCI but does not receive the second DCI indicating that a flexible symbol is of uplink, the UE may perform uplink transmission on the first time-frequency resource according to the embodiments of the first aspect.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiment that the terminal equipment may transmit the uplink signal on the semi-statically configured or semi-persistently scheduled time-frequency resource in the case of not receiving corresponding dynamic indication information for indicating uplink and downlink configuration. The time-frequency resource includes at least one symbol that is pre-defined or semi-statically configured to be flexible. Hence, transmission and reception of a CG-based uplink signal satisfying NR-U requirements, or transmission and reception of other uplink signals on semi-statically configured or semi-persistently scheduled time-frequency resources, may be supported.

Embodiments of a Third Aspect

The embodiments of this disclosure provide a method for receiving an uplink signal, which shall be described from a network device side. The embodiments of this disclosure correspond to the embodiment(s) of the first and/or aspect(s), and contents identical to those in the embodiment(s) of the first and/or aspect(s) shall not be described herein any further.

Figure 14:
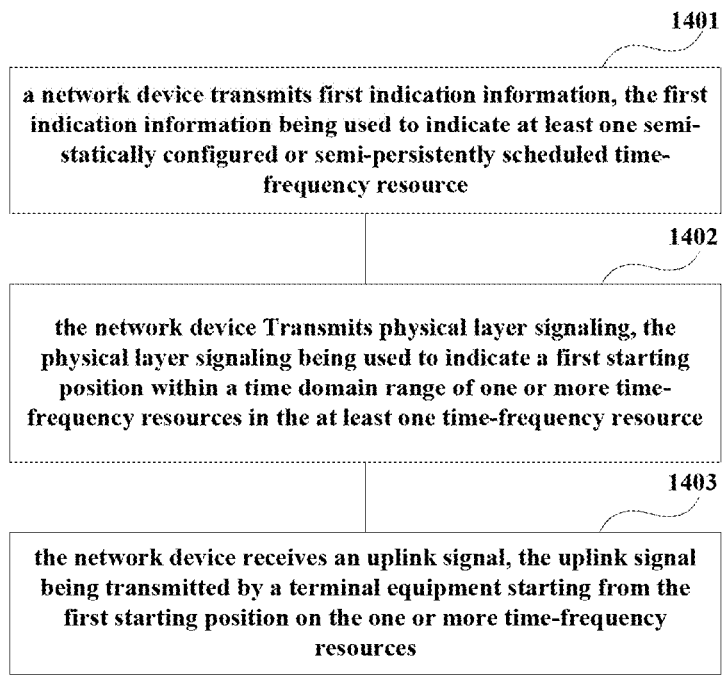
FIG. 14 is a schematic diagram of a method for receiving an uplink signal of embodiments of this disclosure.

FIG. 14 is a schematic diagram of the method for receiving an uplink signal of the embodiment of this disclosure. As shown in FIG. 14, the method includes:

1401: a network device transmits first indication information, the first indication information being used to indicate at least one semi-statically configured or semi-persistently scheduled time-frequency resource;

1402: the network device transmits physical layer signaling, the physical layer signaling being used to indicate a first starting position within a time domain range of one or more time-frequency resources in the at least one time-frequency resource; and 1403: the network device receives an uplink signal, the uplink signal being transmitted by a terminal equipment starting from the first starting position on the one or more time-frequency resources.

In some embodiments, the uplink signal is transmitted starting from the first starting position on the one or more time-frequency resources by the terminal equipment in a first channel access mode.

In some embodiments, there is a correspondence relationship between the first channel access mode and the first starting position, the correspondence relationship being pre-defined or pre-configured, or being indicated by the network device.

In some embodiments, the physical layer signaling includes second indication information, the second indication information being used to indicate the first channel access mode and/or the first starting position.

In some embodiments, the physical layer signaling includes second indication information, the second indication information indicating the first starting position, and third indication information contained in the physical layer signaling or other the physical layer signaling indicates the first channel access mode.

In some embodiments, the second indication information indicates a first offset value of the first starting position relative to a second time position. The second time position may be within the time domain range of the one or more time domain resources; for example, the second time position is a starting position of a first symbol of the first time domain resource, or the second time position is a second starting position.

In some embodiments, the first channel access mode corresponds to the first offset value, or the first channel access mode of the uplink signal corresponds to a set of the first offset values.

In some embodiments, the subcarrier spacing (SCS) of the one or more time-frequency resources is one of at least two subcarrier spacings, and the first starting position is further determined according to the subcarrier spacing of the one or more time-frequency resources.

In some embodiments, the uplink signal carries first uplink information, the first uplink information being mapped onto one or more complete symbols in the time-frequency resource, the complete symbols being able to use all the times to transmit the uplink signal.

In some embodiments, the uplink signal also carries second uplink information, the second uplink information being used to indicate an ending position of the uplink signal, and the network device further determining the ending position of the uplink signal according to the second uplink information.

In some embodiments, the uplink signal is also transmitted by the terminal equipment on the one or more time-frequency resources in the at least one time-frequency resource starting from a second staring position within a time-frequency range of the one or more time-frequency resources; wherein the second starting position is predefined or preconfigured, or is indicated by the network device.

In some embodiments, the fourth indication information is used to indicate a second offset value of the second starting position relative to a starting position of a first symbol of the one or more time-frequency resources, or is used to indicate a set of second offset values.

In some embodiments, the uplink signal is transmitted by the terminal equipment on one or more time-frequency resources of the at least one time-frequency resource by using the first channel access mode and the first starting position when a determination condition is satisfied; wherein the first starting position in the time domain range of the one or more time-frequency resources is indicated by physical layer signaling.

In some embodiments, the uplink signal is transmitted by the terminal equipment on the one or more time-frequency resources by using the second channel access mode and the second starting position when the determination condition is not satisfied; wherein the second starting position in the time domain range of the one or more time-frequency resources is predefined or preconfigured, or is indicated by physical layer signaling.

In some embodiments, the uplink signal is transmitted by the terminal equipment on one or more symbols that are configured to be flexible in a semi-statically configured or semi-persistently scheduled time-frequency resource.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that by indicating the first starting position in the time domain range of one or more semi-statically configured or semi-persistently scheduled time-frequency resources via physical layer signaling and using the first starting position to transmit an uplink signal, transmission and reception of a CG-based uplink signal satisfying NR-U requirements, or transmission and reception of other uplink signals on semi-statically configured or semi-persistently scheduled time-frequency resources, may be supported.

Embodiments of a Fourth Aspect

The embodiments of this disclosure provide an apparatus for transmitting an uplink signal. The apparatus may be, for example, a terminal equipment, or may be one or more components or assemblies configured in a terminal equipment. Contents in the embodiments identical to those in the embodiment(s) of the first and/or second aspect(s) shall not be described herein any further.

Figure 15:
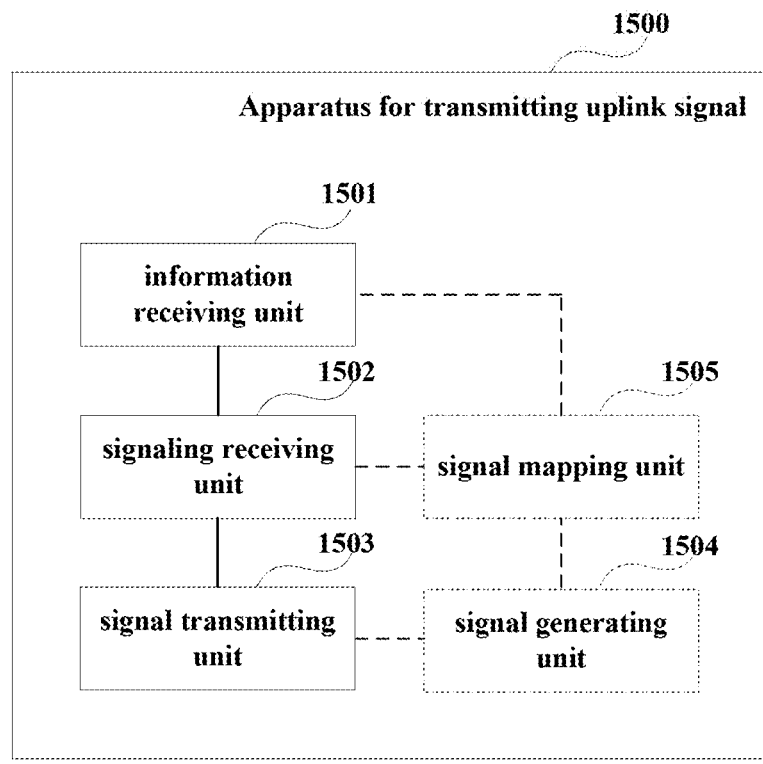
FIG. 15 is a schematic diagram of an apparatus for transmitting an uplink signal of embodiments of this disclosure.

FIG. 15 is a schematic diagram of the apparatus for transmitting an uplink signal of an embodiment of this disclosure. As shown in FIG. 15, an apparatus 1500 for transmitting an uplink signal includes:

an information receiving unit 1501 configured to receive first indication information, the first indication information being used to indicate at least one semi-statically configured or semi-persistently scheduled time-frequency resource;

a signaling receiving unit 1502 configured to receive physical layer signaling, the physical layer signaling being used to indicate a first starting position within a time domain range of one or more time-frequency resources in the at least one time-frequency resource; and a signal transmitting unit 1503 configured to transmit an uplink signal starting from the first starting position on the one or more time-frequency resources.

In some embodiments, the signal transmitting unit 1503 transmits the uplink signal starting from the first starting position on the one or more time-frequency resources by using a first channel access mode.

In some embodiments, when a determination condition is satisfied, the signal transmitting unit 1503 transmits the uplink signal on the one or more time-frequency resources by using the first channel access mode and the first starting position, and when the determination condition is not satisfied, transmits the uplink signal on the one or more time-frequency resources by using a second channel access mode and a second starting position, the second starting position within the time-frequency range of the one or more time-frequency resources being predefined or preconfigured or being indicated by a network device.

In some embodiments, the determination condition includes at least one of the following: whether the physical layer signaling is received no later than a first time position of the one or more time-frequency resources.

In some embodiments, a time interval between the first time position and a starting position of a first time-frequency resource of the one or more time-frequency resources is not less than a preparation time of the uplink signal, or, a time interval between the first time position and the second starting position is not less than a preparation time of the uplink signal.

In some embodiments, the uplink signal includes at least one of the following: a physical uplink shared channel (PUSCH), a physical random access channel (PRACH), a physical uplink control channel (PUCCH), a sounding reference signal (SRS).

In some embodiments, the first channel access mode is a channel access mode for channel sharing, and the second channel access mode is a channel access mode for initializing an occupied channel.

In some embodiments, the first channel access mode and/or the second channel access mode belong to at least one channel access mode supported by a terminal equipment, the at least one channel access mode supported by the terminal equipment being predefined or preconfigured, or being indicated by the network device.

In some embodiments, there exists a correspondence between the first channel access mode and the first starting position, the correspondence being predefined or preconfigured or being indicated by the network device.

In some embodiments, the physical layer signaling includes second indication information,
wherein the second indication information is used to indicate the first channel access mode and/or the first starting position; or the second indication information is used to indicate the first starting position, and third indication information included in the physical layer signaling indicates the first channel access mode.

In some embodiments, the second indication information indicates a first offset value of the first starting position relative to the second time position.

In some embodiments, the second time position is within a time domain range of the one or more time domain resources.

In some embodiments, the second time position is a starting position of a first symbol of the one or more time domain resources, or the second time position is the second staring position.

In some embodiments, the first channel access mode corresponds to the first offset value, or the first channel access mode of the uplink signal corresponds to a set of first offset values.

In some embodiments, the second starting position is indicated by the network device via fourth indication information, the fourth indication information being used to indicate a second offset value of the second starting position relative to a starting position of a first symbol of the one or more time-frequency resources, or being used to indicate a set of second offset values.

In some embodiments, the subcarrier spacing of the one or more time-frequency resources is one of at least two subcarrier spacings, and the signal transmitting unit 1503 further determines the first starting position according to the subcarrier spacing of the one or more time-frequency resources.

In some embodiments, at least two subcarrier spacings correspond to different first starting positions, and/or at least two subcarrier spacings correspond to different second starting positions.

In some embodiments, as shown in FIG. 15, the apparatus 1500 for transmitting an uplink signal further includes:
a signal generating unit 1504 configured to generate the uplink signal according to the subcarrier spacing of the one or more time-frequency resources and/or the adopted channel access mode.

In some embodiments, the signal generating unit 1504 is further configured to, according to the subcarrier spacing of the one or more time-frequency resources, determine a first symbol in the one or more time-frequency resources capable of transmitting the uplink signal and a starting position of a part of the first symbol capable of transmitting the uplink signal.

In some embodiments, as shown in FIG. 15, the apparatus 1500 for transmitting an uplink signal further includes:
a signal mapping unit 1505 configured to map the first uplink information according to the subcarrier spacing of the one or more time-frequency resources and/or the adopted channel access mode.

In some embodiments, the signal mapping unit 1505 is further configured to map the first uplink information onto one or more complete symbols in the one or more time-frequency resources, the complete symbols being capable of using all times to transmit the uplink signal.

In some embodiments, the uplink signal also carries second uplink information, the second uplink information being used to indicate an ending position of the uplink signal.

In some embodiments, the signal transmitting unit 1503 is further configured to transmit the uplink signal on one or more symbols that are configured to be flexible in one or more semi-statically configured or semi-persistently scheduled time-frequency resources.

In some embodiments, in a case where dynamic indication information indicating performing uplink and downlink configuration, the signal transmitting unit 1503 is further configured to transmit the uplink and downlink on one or more symbols that are configured to be flexible via cell common uplink and downlink configuration information and/or device-specific uplink and downlink configuration information.

It should be noted that the components or modules related to this disclosure are only described above. However, this disclosure is not limited thereto, and the apparatus 1500 for transmitting an uplink signal may further include other components or modules, and reference may be made to related techniques for particulars of these components or modules.

Furthermore, for the sake of simplicity, connection relationships between the components or modules or signal profiles thereof are only illustrated in FIG. 15. However, it should be understood by those skilled in the art that such related techniques as bus connection, etc., may be adopted.

And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that by indicating the first starting position in the time domain range of one or more semi-statically configured or semi-persistently scheduled time-frequency resources via physical layer signaling and using the first starting position to transmit an uplink signal, transmission and reception of a CG-based uplink signal satisfying NR-U requirements, or transmission and reception of other uplink signals on semi-statically configured or semi-persistently scheduled time-frequency resources, may be supported.

Embodiments of a Fifth Aspect

The embodiments of this disclosure provide an apparatus for receiving an uplink signal. The apparatus may be, for example, a network device, or may be one or more components or assemblies configured in a network device. Contents in these embodiments identical to those in the embodiments of the first to third aspects shall not be described herein any further.

Figure 16:
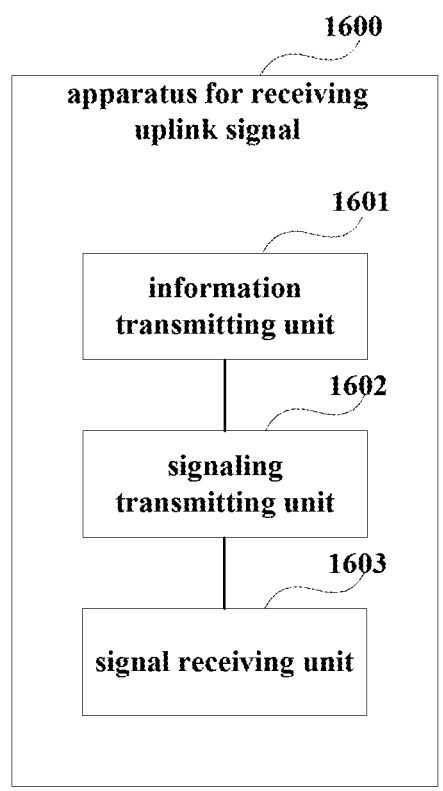
FIG. 16 is a schematic diagram of an apparatus for receiving an uplink signal of embodiments of this disclosure.

FIG. 16 is a schematic diagram of the apparatus for receiving an uplink signal of an embodiment of this disclosure. As shown in FIG. 16, an apparatus 1600 for receiving an uplink signal includes:

- an information transmitting unit 1601 configured to transmit first indication information, the first indication information being used to indicate at least one semi-statically configured or semi-persistently scheduled time-frequency resource;
- a signaling transmitting unit 1602 configured to transmit physical layer signaling, the physical layer signaling being used to indicate a first starting position within a time domain range of one or more time-frequency resources in the at least one time-frequency resource; and
- a signal receiving unit 1603 configured to receive an uplink signal, the uplink signal being transmitted starting from the first starting position on the one or more time-frequency resources.

It should be noted that the components or modules related to this disclosure are only described above. However, this disclosure is not limited thereto, and the apparatus 1600 for receiving an uplink signal may further include other components or modules, and reference may be made to related techniques for particulars of these components or modules.

Furthermore, for the sake of simplicity, connection relationships between the components or modules or signal profiles thereof are only illustrated in FIG. 16. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiment that by indicating the first starting position in the time domain range of one or more semi-statically configured or semi-persistently scheduled time-frequency resources via physical layer signaling and using the first starting position to transmit an uplink signal, transmission and reception of a CG-based uplink signal satisfying NR-U requirements, or transmission and reception of other uplink signals on semi-statically configured or semi-persistently scheduled time-frequency resources, may be supported.

Embodiments of a Sixth Aspect

The embodiments of this disclosure provide a communication system, and reference may be made to FIG. 1, with contents identical to those in the embodiments of the first to the fifth aspect being not going to be described herein any further.

In some embodiments, a communication system 100 may include:

- a terminal equipment 102 configured to receive first indication information, the first indication information being used to indicate at least one semi-statically configured or semi-persistently scheduled time-frequency resource; receive physical layer signaling, the physical layer signaling being used to indicate a first starting position within a time domain range of one or more time-frequency resources in the at least one time-frequency resource; and transmit an uplink signal starting from the first starting position on the one or more time-frequency resources; and the network device 101 configured to transmit the first indication information and the physical layer signaling, and receive the uplink signal.

The embodiments of this disclosure further provide a network device, which may be, for example, a base station. However, this disclosure is not limited thereto, and it may also be another network device.

Figure 17:
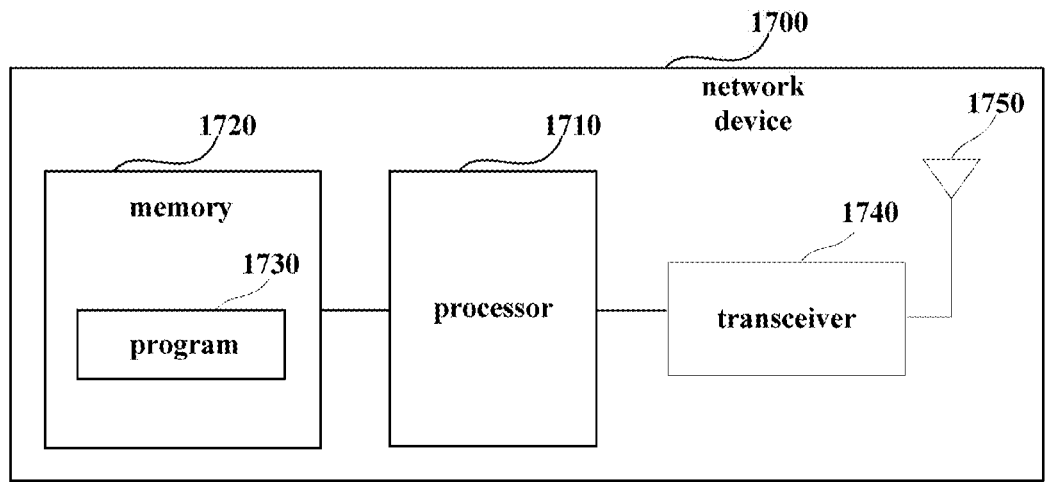
FIG. 17 is a schematic diagram of a network device of embodiments of this disclosure.

FIG. 17 is a schematic diagram of the network device of the embodiment of this disclosure. As shown in FIG. 17, a network device 1700 may include a processor 1710 (such as a central processing unit (CPU)) and a memory 1720, the memory 1720 being coupled to the processor 1710. The memory 1720 may store various data, and furthermore, it may store a program 1730 for data processing, and execute the program 1730 under control of the processor 1710.

For example, the processor 1710 may be configured to execute the program to carry out the method for receiving an uplink signal as described in the embodiments of the third aspect. For example, the processor 1710 may be configured to execute the following control: transmitting first indication information, the first indication information being used to indicate at least one semi-statically configured or semi-persistently scheduled time-frequency resource; transmitting physical layer signaling, the physical layer signaling being used to indicate a first starting position within a time domain range of one or more time-frequency resources in the at least one time-frequency resource; and receiving an uplink signal, the uplink signal being transmitted starting from the first starting position on the one or more time-frequency resources.

Furthermore, as shown in FIG. 17, the network device 1700 may include a transceiver 1740, and an antenna 1750, etc. Functions of the above components are similar to those in the relevant art, and shall not be described herein any further. It should be noted that the network device 1700 does not necessarily include all the parts shown in FIG. 17, and furthermore, the network device 1700 may include parts not shown in FIG. 17, and the relevant art may be referred to.

The embodiment of this disclosure further provides a terminal equipment; however, this disclosure is not limited thereto, and it may also be another equipment.

Figure 18:
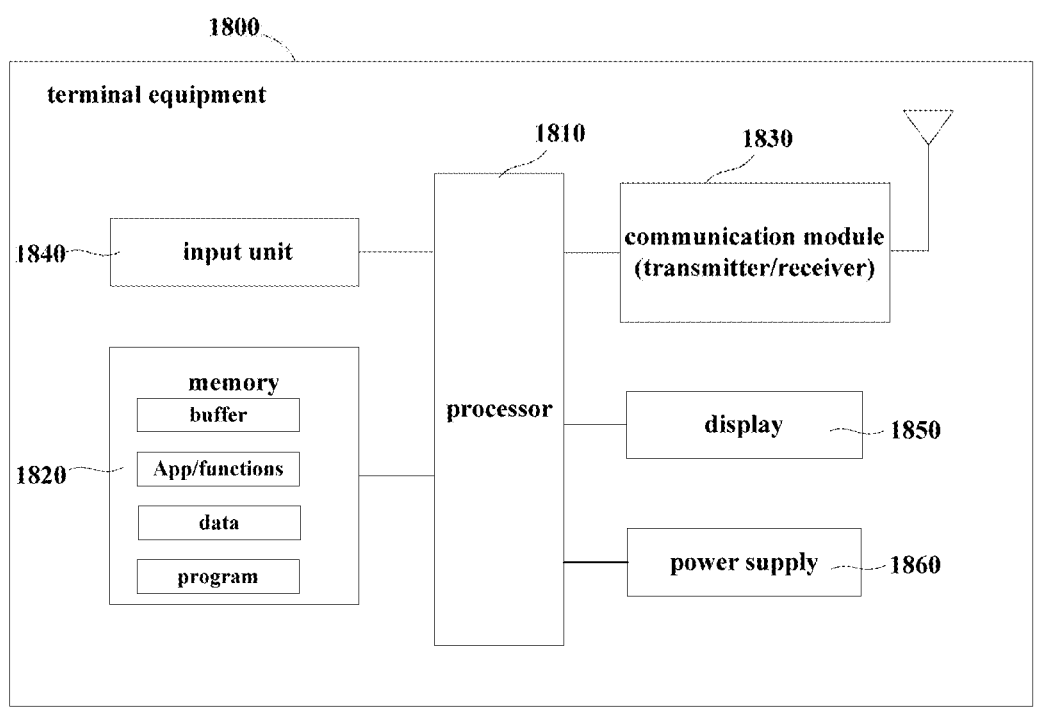
FIG. 18 is a schematic diagram of a terminal equipment of embodiments of this disclosure.

FIG. 18 is a schematic diagram of the terminal equipment of the embodiment of this disclosure. As shown in FIG. 18, a terminal equipment 1800 may include a processor 1810 and a memory 1820, the memory 1820 storing data and a program and being coupled to the processor 1810. It should be noted that this figure is illustrative only, and other types of structures may also be used, so as to supplement or replace this structure and achieve a telecommunications function or other functions.

For example, the processor 1810 may be configured to execute a program to carry out the method for transmitting an uplink signal as described in the embodiment(s) of the first aspect and/or the second aspect. For example, the processor 1810 may be configured to perform the following control: receiving first indication information, the first indication information being used to indicate at least one semi-statically configured or semi-persistently scheduled time-frequency resource; receiving physical layer signaling, the physical layer signaling being used to indicate a first starting position within a time domain range of one or more time-frequency resources in the at least one time-frequency resource; and transmitting an uplink signal starting from the first starting position on the one or more time-frequency resources.

As shown in FIG. 18, the terminal equipment 1800 may further include a communication module 1830, an input unit

1840, a display 1850, and a power supply 1860; wherein functions of the above components are similar to those in the relevant art, which shall not be described herein any further. It should be noted that the terminal equipment 1800 does not necessarily include all the parts shown in FIG. 18, and the above components are not necessary. Furthermore, the terminal equipment 1800 may include parts not shown in FIG. 18, and the relevant art may be referred to.

An embodiment of this disclosure provides a computer program, which, when executed in a terminal equipment, will cause the terminal equipment to carry out the method for transmitting an uplink signal as described in the embodiment(s) of the first aspect and/or the second aspect.

An embodiment of this disclosure provides a storage medium, including a computer program, which will cause a terminal equipment to carry out method for transmitting an uplink signal as described in the embodiment(s) of the first aspect and/or the second aspect.

An embodiment of this disclosure provides a computer program, which, when executed in a network device, will cause the network device to carry out the method for receiving an uplink signal as described in the embodiments of the third aspect.

An embodiment of this disclosure provides a storage medium, including a computer program, which will cause a network device to carry out the method for receiving an uplink signal as described in the embodiments of the third aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A method for transmitting an uplink signal, including:

receiving first indication information by a terminal equipment, the first indication information being used to indicate at least one semi-statically configured or semi-persistently scheduled time-frequency resource;

receiving physical layer signaling by the terminal equipment, the physical layer signaling being used to indicate a first starting position within a time domain range of one or more time-frequency resource(s) in the at least one time-frequency resource; and transmitting an uplink signal by the terminal equipment starting from the first starting position on the one or more time-frequency resource(s).

Supplement 2. The method according to supplement 1, wherein the transmitting an uplink signal by the terminal equipment starting from the first starting position on the one or more time-frequency resource(s) includes:

transmitting, by the terminal equipment, the uplink signal starting from the first starting position on the one or more time-frequency resource(s) by using a first channel access mode.

Supplement 3. The method according to supplement 1 or 2, wherein when a determination condition is satisfied, the terminal equipment transmits the uplink signal starting from the first starting position on the one or more time-frequency resource(s) by using a first channel access mode;

and when the determination condition is not satisfied, the terminal equipment transmits the uplink signal starting from a second starting position on the one or more time-frequency resource(s) by using a second channel access mode, the second starting position within the time domain range of the one or more time-frequency resource(s) being predefined or preconfigured or being indicated by a network device.

Supplement 4. The method according to supplement 3, wherein the determination condition includes at least one of the following: whether the physical layer signaling is received no later than a first time position of the one or more time-frequency resource(s).

Supplement 5. The method according to supplement 4, wherein a time interval between the first time position and a starting position of a first time-frequency resource of the one or more time-frequency resource(s) is not less than a preparation time of the uplink signal, or, a time interval between the first time position and the second starting position is not less than a preparation time of the uplink signal.

Supplement 6. The method according to any one of supplements 1-5, wherein the uplink signal includes at least one of the following signals or channels: a physical uplink shared channel (PUSCH), a physical random access channel (PRACH), a physical uplink control channel (PUCCH), a sounding reference signal (SRS).

Supplement 7. The method according to any one of supplements 2-6, wherein the first channel access mode is a channel access mode for channel sharing.

Supplement 8. The method according to supplement 7, wherein the first channel access mode is one of at least one channel access mode for channel sharing.

Supplement 9. The method according to any one of supplements 3-8, wherein the second channel access mode is a channel access mode used to initialize an occupied channel.

Supplement 10. The method according to any one of supplements 7-9, wherein the first channel access mode and/or the second channel access mode belong to at least one channel access mode supported by the terminal equipment.

Supplement 11. The method according to supplement 10, wherein the at least one channel access mode supported by the terminal equipment is predefined or preconfigured, and/or is indicated by a network device.

Supplement 12. The method according to any one of supplements 2-11, wherein the physical layer signaling includes second indication information, the second indication information being used to indicate the first channel access mode and/or the first starting position.

Supplement 13. The method according to any one of supplements 2-11, wherein the physical layer signaling includes second indication information, the second indication information being used to indicate the first starting position, and third indication information included in the physical layer signaling or other physical layer signaling indicates the first channel access mode.

Supplement 14. The method according to any one of supplements 2-13, wherein there is a correspondence relationship between the first channel access mode and the first starting position, the correspondence relationship being predefined or pre-configured, or being indicated by a network device.

Supplement 15. The method according to any one of supplements 10-13, wherein the second indication information indicates a first offset value of the first starting position relative to a second time position.

Supplement 16. The method according to supplement 15, wherein the second time position is within a time domain range of the one or more time-frequency resource(s).

Supplement 17. The method according to supplement 15 or 16, wherein the second time position is a starting position of a first symbol of the one or more time-frequency resource(s), or the second time position is the second starting position.

Supplement 18. The method according to any one of supplements 15-17, wherein the first channel access mode corresponds to the first offset value, or the first channel access mode corresponds to a set of first offset values.

Supplement 19. The method according to any one of supplements 15-18, wherein if the one or more time-frequency resource(s) are within a channel occupation time including at least two times of uplink and downlink conversion and the terminal equipment transmits the uplink signal by using the first channel access mode on the one or more time-frequency resource(s), the first offset value is not greater than 25 us.

Supplement 20. The method according to any one of supplements 3-11, wherein the second starting position is indicated by a network device via fourth indication information;
wherein the fourth indication information is used to indicate a second offset value of the second starting position relative to a starting position of a first symbol of the one or more time-frequency resource(s), or is used to indicate a set of second offset values.

Supplement 21. The method according to any one of supplements 1-20, wherein a subcarrier spacing (SCS) of the one or more time-frequency resource(s) is one of at least two subcarrier spacings,
and the terminal equipment further determines the first starting position and/or the second starting position according to the subcarrier spacing of the one or more time-frequency resource(s).

Supplement 22. The method according to supplement 21, wherein the at least two subcarrier spacings correspond to different first starting positions.

Supplement 23. The method according to supplement 21, wherein at least two subcarrier spacings correspond to different second starting positions.

Supplement 24. The method according to supplement 21, wherein the at least two subcarrier spacings correspond to different first offset values, or the at least two subcarrier spacings correspond to different sets of first offset values.

Supplement 25. The method according to supplement 21, wherein the at least two subcarrier spacings correspond to different second offset values, or the at least two subcarrier spacings correspond to different sets of second offset values.

Supplement 26. The method according to supplement 21, wherein a reference subcarrier spacing corresponds to a first offset value, or the reference subcarrier spacing corresponds to a set of first offset values.

Supplement 27. The method according to supplement 21, wherein a reference subcarrier spacing corresponds to a second offset value, or the reference subcarrier spacing corresponds to a set of second offset values.

Supplement 28. The method according to any one of supplements 1-27, wherein the method further includes:
generating the uplink signal by the terminal equipment according to the subcarrier spacing of the one or more time-frequency resource(s) and/or the adopted channel access mode.

Supplement 29. The method according to supplement 28, wherein according to the subcarrier spacing of the one or more time-frequency resource(s), the terminal equipment determines a first symbol in the one or more time-frequency resource(s) capable of transmitting the uplink signal and a starting position of a part of the first symbol capable of transmitting the uplink signal.

Supplement 30. The method according to any one of supplements 1-29, wherein the method further includes:
mapping the first uplink information by the terminal equipment according to at least one of the following or any combination thereof: the subcarrier spacing of the one or more time-frequency resources, the adopted channel access mode, indication information used for indicating mapping a symbol position of the first uplink information.

Supplement 31. The method according to supplement 30, wherein the terminal equipment maps the first uplink information onto one or more complete symbol(s) in the one or more time-frequency resource(s), the complete symbol(s) being capable of using all times to transmit the uplink signal.

Supplement 32. The method according to supplement 30 or 31, wherein for at least two subcarrier spacings and/or at least two channel access modes, symbol positions mapping the first uplink information in the one or more time-frequency resource(s) are at least partially different.

Supplement 33. The method according to any one of supplements 30-32, wherein the symbol positions mapping the first uplink information in the one or more time-frequency resource(s) are predefined or preconfigured, or are indicated by a network device.

Supplement 34. The method according to any one of supplements 1-33, wherein the uplink signal further carries second uplink information, the second uplink information being used to indicate an ending position of the uplink signal.

Supplement 35. The method according to supplement 34, wherein for at least two subcarrier spacings, the ending positions of the uplink signals indicated by the second uplink information are different.

Supplement 36. The method according to any one of supplements 1-35, wherein the one or more time-frequency resource(s) include at least one symbol that is predefined or semi-statically configured as being flexible.

Supplement 37. The method according to any one of supplements 1-36, wherein the terminal equipment is able to transmit the uplink signal on one or more symbol(s) that is/are predefined or semi-statically configured as being flexible in the one or more time-frequency resource(s).

Supplement 38. The method according to supplement 36 or 37, wherein in a case where the terminal equipment does not receive corresponding dynamic indication information used for indicating uplink and downlink configuration, the terminal equipment transmits the uplink signal on the one or more time-frequency resource(s).

Supplement 39. The method according to any one of supplements 36-38, wherein whether the terminal equipment is allowed to transmit the uplink signal on the one or more symbol(s) that are configured as being flexible in a case where the terminal equipment does not receive the corresponding dynamic indication information indicating uplink and downlink configuration is pre-defined or preconfigured, or is indicated by a network device.

Supplement 40. The method according to any one of supplements 36-38, wherein whether the terminal equipment is allowed to transmit the uplink signal on the one or more symbol(s) that are configured as being flexible in a case where the terminal equipment does not receive the corresponding dynamic indication information indicating uplink and downlink configuration is pre-defined or preconfigured, or is indicated by a network device for a type of the uplink signal.

Supplement 41. A method for transmitting an uplink signal, including:
receiving first indication information by a terminal equipment, the first indication information being used to indicate at least one semi-statically configured or semi-persistently scheduled time-frequency resource;
transmitting an uplink signal by the terminal equipment starting from a second starting position within a time domain range of the one or more time-frequency resource(s) on one or more time-frequency resource(s) in the at least one time-frequency resource;
wherein the second starting position is predefined or preconfigured, or is indicated by a network device via fourth indication information.

Supplement 42. The method according to supplement 41, wherein the fourth indication information is used to indicate a second offset value of the second starting position relative to a starting position of a first symbol of the one or more time-frequency resource(s), or is used to indicate a set of second offset values.

Supplement 43. The method according to supplement 41 or 42, wherein the subcarrier spacing (SCS) of the one or more time-frequency resources is one of at least two subcarrier spacings, and the terminal equipment further determines a first starting position and/or a second starting position according to the subcarrier spacing of the one or more time-frequency resource(s).

Supplement 44. The method according to supplement 43, wherein the at least two subcarrier spacings correspond to different first starting positions.

Supplement 45. The method according to supplement 43, wherein the at least two subcarrier spacings correspond to different second starting positions.

Supplement 46. The method according to supplement 43, wherein the at least two subcarrier spacings correspond to different first offset values, or the at least two subcarrier spacings correspond to different sets of first offset values.

Supplement 47. The method according to supplement 43, wherein the at least two subcarrier spacings correspond to different second offset values, or the at least two subcarrier spacings correspond to different sets of second offset values.

Supplement 48. The method according to supplement 43, wherein a reference subcarrier spacing corresponds to a first offset value, or the reference subcarrier spacing corresponds to a set of first offset values.

Supplement 49. The method according to supplement 43, wherein a reference subcarrier spacing corresponds to a second offset value, or the reference subcarrier spacing corresponds to a set of second offset values.

Supplement 50. The method according to any one of supplements 41-49, wherein the method further includes:
generating the uplink signal by the terminal equipment according to the subcarrier spacing of the one or more time-frequency resource(s) and/or an adopted channel access mode.

Supplement 51. The method according to supplement 50, wherein according to the subcarrier spacing of the one or more time-frequency resource(s), the terminal equipment determined a first symbol in the one or more time-frequency resource(s) capable of transmitting the uplink signal and a starting position of a part of the first symbol capable of transmitting the uplink signal.

Supplement 52. The method according to any one of supplements 41-51, wherein the method further includes:
mapping the first uplink information by the terminal equipment according to at least one piece of the following information or any combination thereof: the subcarrier spacing of the one or more time-frequency resource(s), the adopted channel access mode, indication information used for indicating mapping a symbol position of the first uplink information.

Supplement 53. The method according to supplement 52, wherein the terminal equipment maps the first uplink information onto one or more complete symbol(s) in the one or more time-frequency resource(s), the complete symbol(s) being able to use all times for transmitting the uplink signal.

Supplement 54. The method according to supplement 52 or 53, wherein for at least two subcarrier spacings and/or at least two channel access modes, symbol positions mapping the first uplink information in the one or more time-frequency resource(s) are at least partially different.

Supplement 55. The method according to any one of supplements 52-54, wherein the symbol positions mapping the first uplink information in the one or more time-frequency resource(s) are predefined or preconfigured, or are indicated by a network device.

Supplement 56. The method according to any one of supplements 41-55, wherein the uplink signal further carries second uplink information, the second uplink information being used to indicate an ending position of the uplink signal.

Supplement 57. The method according to supplement 56, wherein for the at least two subcarrier spacings, ending positions of the uplink signals indicated by the second uplink information are different.

Supplement 58, the method according to any one of supplements 41-57, wherein the one or more time-frequency resource(s) include at least one symbol that is predefined or semi-statically configured as being flexible.

Supplement 59. The method according to any one of supplements 41-58, wherein the terminal equipment is able to transmit the uplink signal on one or more symbol(s) that is/are predefined or semi-statically configured as being flexible in the one or more time-frequency resource(s).

Supplement 60. The method according to supplement 58 or 59, wherein when the terminal equipment does not receive corresponding dynamic indication information used for indicating uplink and downlink configuration, the terminal equipment transmits the uplink signal on the one or more time-frequency resource(s).

Supplement 61. The method according to any one of supplements 58-60, wherein whether the terminal equipment is allowed to transmit the uplink signal on the one or more symbol(s) that are configured as being flexible in a case where the terminal equipment does not receive the corresponding dynamic indication information indicating uplink and downlink configuration is pre-defined or preconfigured, or is indicated by a network device.

Supplement 62. The method according to any one of supplements 58-60, wherein whether the terminal equipment is allowed to transmit the uplink signal on the one or more symbol(s) that are configured as being flexible in a case where the terminal equipment does not receive the corresponding dynamic indication information indicating uplink and downlink configuration is pre-defined or preconfigured, or is indicated by a network device for a type of the uplink signal.

Supplement 63. A method for transmitting an uplink signal, including:
transmitting an uplink signal by a terminal equipment starting from a first starting position on one or more semi-statically configured or semi-persistently scheduled time-frequency resource(s) by using a first channel access mode when a determination condition is satisfied; wherein the first starting position in a time domain range of the one or more time-frequency resource(s) is indicated by physical layer signaling; and
transmitting the uplink signal by the terminal equipment starting from a second starting position on the one or more semi-statically configured or semi-persistently scheduled time-frequency resource(s) by using a second channel access mode when the determination condition is not satisfied; wherein the second starting position in the time domain range of the one or more time-frequency resource(s) is predefined or preconfigured, or is indicated by a network device.

Supplement 64. The method according to supplement 62, wherein the determination condition includes at least one of the following that: whether the physical layer signaling is received no later than a first time position of the one or more time-frequency resource(s).

Supplement 65. A method for transmitting an uplink signal, including:
generating an uplink signal by a terminal equipment; and
transmitting the uplink signal by the terminal equipment on a semi-statically configured or semi-persistently scheduled time-frequency resource including at least one symbol that is predefined or semi-statically configured as being flexible in a case where the terminal equipment does not receive corresponding dynamic indication information indicating uplink and downlink configuration.

Supplement 66. The method according to supplement 65, wherein whether the terminal equipment is allowed to transmit the uplink signal on the one or more symbol(s) that are configured as being flexible in a case where the terminal equipment does not receive the corresponding dynamic indication information indicating uplink and downlink configuration is pre-defined or preconfigured, or is indicated by a network device.

Supplement 67. The method according to supplement 65, wherein whether the terminal equipment is allowed to transmit the uplink signal on the one or more symbol(s) that are configured as being flexible in a case where the terminal equipment does not receive the corresponding dynamic indication information indicating uplink and downlink configuration is pre-defined or preconfigured, or is indicated by a network device for a type of the uplink signal.

Supplement 68. A method for receiving an uplink signal, including:
transmitting first indication information by a network device, the first indication information being used to indicate at least one semi-statically configured or semi-persistently scheduled time-frequency resource;
transmitting physical layer signaling by the network device, the physical layer signaling being used to indicate a first starting position within a time domain range of one or more time-frequency resource(s) in the at least one time-frequency resource; and
receiving an uplink signal by the network device, the uplink signal being transmitted, by a terminal equipment, starting from the first starting position on the one or more time-frequency resource(s).

Supplement 69. The method according to supplement 68, wherein the uplink signal carries first uplink information, the first uplink information being mapped onto one or more complete symbol(s) in the time-frequency resource, the complete symbol(s) being able to use all the times to transmit the uplink signal.

Supplement 70. The method according to supplement 68, wherein the uplink signal further carries second uplink information, the second uplink information being used to indicate an ending position of the uplink signal;
and the network device further determines the ending position of the uplink signal according to the second uplink information.

Supplement 71. A method for receiving an uplink signal, including:
transmitting first indication information by a network device, the first indication information being used to indicate at least one semi-statically configured or semi-persistently scheduled time-frequency resource; and receiving an uplink signal by the network device, the uplink signal being transmitted by a terminal equipment on one or more time-frequency resource(s) in the at least one time-frequency resource starting from a second starting position within a time domain range of the one or more time-frequency resource(s);

wherein the second starting position is predefined or preconfigured, or is indicated by the network device via fourth indication information.

Supplement 72. The method according to supplement 71, wherein the fourth indication information indicates a second offset value of the second starting position relative to a starting position of a first symbol of the one or more time-frequency resource(s), or indicates a set of second offset values.

Supplement 73. A method for receiving an uplink signal, including:

transmitting first indication information by a network device, the first indication information being used to indicate at least one semi-statically configured or semi-persistently scheduled time-frequency resource; and receiving an uplink signal by the network device;

wherein when a determination condition is satisfied, the uplink signal is transmitted, by a terminal equipment, starting from a first starting position on one or more time-frequency resource(s) by using a first channel access mode; wherein the first starting position within a time domain range of the one or more time-frequency resource(s) is indicated by physical layer signaling;

or, when the determination condition is not satisfied, the uplink signal is transmitted, by a terminal equipment, starting from a second starting position on one or more time-frequency resource(s) by using a second channel access mode, wherein the second starting position within a time domain range of the one or more time-frequency resource(s) is predefined or pre-configured, or is indicated by the network device.

Supplement 74. The method according to supplement 73, wherein the determination condition includes at least one of the following that: whether the physical layer signaling is received no later than a first time position of the one or more time-frequency resources.

Supplement 75. A method for receiving an uplink signal, including:

receiving, by a network device, uplink signal transmitted by a terminal equipment, wherein the uplink signal is transmitted by the terminal equipment on a semi-statically configured or semi-persistently scheduled time-frequency resource including at least one symbol that is predefined or semi-statically configured as being flexible in a case where the terminal equipment does not receive corresponding dynamic indication information indicating uplink and downlink configuration.

Supplement 76. A terminal equipment, including a memory and a processor, the memory storing a computer program, and the processor being configured to execute the computer program to carry out the method for transmitting an uplink signal as described in any one of supplements 1-67.

Supplement 77. A network device, including a memory and a processor, the memory storing a computer program, and the processor being configured to execute the computer program to carry out the method for receiving an uplink signal as described in any one of supplements 68-75.

Supplement 78. A communication system, including:

a terminal equipment configured to receive first indication information, the first indication information being used to indicate at least one semi-statically configured or semi-persistently scheduled time-frequency resource; receive physical layer signaling, the physical layer signaling being used to indicate a first starting position within a time domain range of one or more time-frequency resource(s) in the at least one time-frequency resource; and transmit an uplink signal starting from the first starting position on the one or more time-frequency resource(s); and a network device configured to transmit the first indication information and the physical layer signaling, and receive the uplink signal.

What is claimed is:

1. An apparatus for transmitting an uplink signal, comprising:

a receiver configured to receive a radio resource control (RRC) signaling, the RRC signaling indicating that a terminal equipment is allowed to transmit an uplink signal on one or more symbols configured as being flexible in a case where the terminal equipment does not receive downlink control information used for indicating uplink and downlink configurations for the one or more symbols, and a transmitter configured to, in a case where the terminal equipment does not receive the downlink control information used for indicating uplink and downlink configurations for the one or more symbols, transmit the uplink signal on a semi-statically configured or semi-persistently scheduled time-frequency resource comprising at least one symbol in the one or more symbols.

2. The apparatus according to claim 1, wherein when a determination condition is satisfied, the transmitter transmits the uplink signal starting from the first starting position on the semi-statically configured or semi-persistently scheduled time-frequency resource by using a first channel access mode; and when the determination condition is not satisfied, the transmitter transmits the uplink signal starting from a second starting position on the semi-statically configured or semi-persistently scheduled time-frequency resource by using a second channel access mode, the second starting position within the time domain range of the semi-statically configured or semi-persistently scheduled time-frequency resource being predefined or preconfigured or being indicated by a network device.

3. The apparatus according to claim 2, wherein the determination condition comprises at least one of the following: whether the physical layer signaling is received no later than a first time position of the one or more time-frequency resource(s).

4. The apparatus according to claim 3, wherein a time interval between the first time position and a starting position of a first time-frequency resource of the semi-statically configured or semi-persistently scheduled time-frequency resource is not less than a preparation time of the uplink signal, or, a time interval between the first time position and the second starting position is not less than a preparation time of the uplink signal.

5. The apparatus according to claim 2, wherein the second channel access mode is a channel access mode for initializing an occupied channel.

6. The apparatus according to claim 2, wherein the first channel access mode and/or the second channel access mode belong(s) to at least one channel access mode supported by the terminal equipment.

7. The apparatus according to claim 6, wherein the at least one channel access mode supported by the terminal equipment is predefined or preconfigured, or is indicated by the network device.

8. The apparatus according to claim 2, wherein the second starting position is indicated by the network device via fourth indication information;
- wherein the fourth indication information is used to indicate a second offset value of the second starting position relative to a starting position of a first symbol of the semi-statically configured or semi-persistently scheduled time-frequency resource, or is used to indicate a set of second offset values.

9. The apparatus according to claim 1, wherein
- the uplink signal is SRS (Sounding Reference Signal), PUCCH (Physical Uplink Control Channel), PUSCH (Physical Uplink Shared Channel), or PRACH (Physical Random Access Channel),
- the RRC signaling is dedicated for the terminal equipment, and
- the downlink control information is DCI (Downlink Control Information) format 2_0.

10. The apparatus according to claim 1, wherein
- the receiver further configured to receive first indication information, the first indication information being used to indicate at least one semi-statically configured or semi-persistently scheduled time-frequency resource.

11. The apparatus according to claim 1, wherein the uplink signal is transmitted by using a type of channel access comprising a contention window.

12. An apparatus for receiving an uplink signal, comprising:
- a transmitter configured to transmit a radio resource control (RRC) signaling indicating a terminal equipment is allowed to transmit an uplink signal on one or more symbols configured as being flexible in a case where the terminal equipment does not receive downlink control information used for indicating uplink and downlink configurations for the one or more symbols, and
- a receiver configured to receive an uplink signal, wherein, the uplink signal is transmitted by the terminal equipment on a semi-statically configured or semi-persistently scheduled time-frequency resource comprising at least one symbol in the one or more symbols when the terminal equipment does not receive the downlink control information used for indicating uplink and downlink configurations for the one or more symbols.

* * * * *